(12) United States Patent
Dresens et al.

(10) Patent No.: US 10,288,052 B2
(45) Date of Patent: May 14, 2019

(54) HELIUM MANAGEMENT CONTROL SYSTEM

(71) Applicant: Brooks Automation, Inc., Chelmsford, MA (US)

(72) Inventors: Paul E. Dresens, Wayland, MA (US); Gary S. Ash, Dartmouth, MA (US); Allen J. Bartlett, Uxbridge, MA (US); Bruce R. Andeen, Collierville, TN (US); Y. Roberto Than, Port Jefferson, NY (US); Joseph Chopy, Jr., Cumberland, RI (US)

(73) Assignee: Brooks Automation, Inc., Chelmsford, MA (US)

( * ) Notice: Subject to any disclaimer, the term of this patent is extended or adjusted under 35 U.S.C. 154(b) by 53 days.

(21) Appl. No.: 15/143,125

(22) Filed: Apr. 29, 2016

(65) Prior Publication Data

US 2017/0002802 A1    Jan. 5, 2017

Related U.S. Application Data

(60) Continuation of application No. 14/523,507, filed on Oct. 24, 2014, now Pat. No. 9,334,859, which is a
(Continued)

(51) Int. Cl.
*B01D 8/00* (2006.01)
*F17D 1/04* (2006.01)
(Continued)

(52) U.S. Cl.
CPC ............... *F04B 37/08* (2013.01); *B01D 8/00* (2013.01); *F17D 1/04* (2013.01); *F17D 3/01* (2013.01);
(Continued)

(58) Field of Classification Search
CPC .......... F04B 37/08; F04B 49/065; F17D 1/04; F17D 3/01; F17D 3/18; F25B 9/10;
(Continued)

(56) References Cited

U.S. PATENT DOCUMENTS 3,188,821 A * 6/1965 Chellis ..................... F25B 9/14
62/6
4,307,576 A 12/1981 Takano et al.
(Continued)

FOREIGN PATENT DOCUMENTS

EP         0 412 474 A2    4/1990
EP         0578241 B1    10/1997
(Continued)

*Primary Examiner* — Kun Kai Ma
(74) *Attorney, Agent, or Firm* — Hamilton, Brook, Smith & Reynolds, P.C.

(57) ABSTRACT

A helium management control system for controlling the helium refrigerant supply from a common manifold supplies cryogenic refrigerators with an appropriate helium supply. The system employs sensors to monitor and regulate the overall refrigerant supply to deliver an appropriate refrigerant supply to each of the cryogenic refrigerators depending on the computed aggregate cooling demand of all of the cryogenic refrigerators. An appropriate supply of helium is distributed to each cryopump by sensing excess and sparse helium and redistributing refrigerant accordingly. If the total refrigeration supply exceeds the demand, or consumption, excess refrigerant is directed to cryogenic refrigerators which can utilize the excess helium to complete a current cooling function more quickly. If the total refrigeration demand exceeds the total refrigeration supply, the refrigerant supply to some or all of the cryogenic refrigerators will be reduced accordingly so that detrimental or slowing effects are minimized based upon the current cooling function.

20 Claims, 20 Drawing Sheets

Related U.S. Application Data continuation of application No. 13/605,738, filed on Sep. 6, 2012, now Pat. No. 8,869,552, which is a continuation of application No. 12/848,681, filed on Aug. 2, 2010, now Pat. No. 8,261,562, which is a division of application No. 11/590,673, filed on Oct. 31, 2006, now Pat. No. 7,788,942, which is a continuation-in-part of application No. 09/909,863, filed on Jul. 20, 2001, now Pat. No. 7,127,901.

(51) Int. Cl.

| | | |
|---|---|---|
| *F17D 3/01* | (2006.01) | |
| *F17D 3/18* | (2006.01) | |
| *F25B 9/00* | (2006.01) | |
| *F25B 9/14* | (2006.01) | |
| *F25J 1/00* | (2006.01) | |
| *F04B 37/08* | (2006.01) | |
| *F24F 11/30* | (2018.01) | |
| *F25B 45/00* | (2006.01) | |
| *F24F 110/50* | (2018.01) | |

(52) U.S. Cl.
CPC ............... *F17D 3/18* (2013.01); *F24F 11/30* (2018.01); *F25B 9/002* (2013.01); *F25B 9/14* (2013.01); *F25B 45/00* (2013.01); *F25J 1/0007* (2013.01); *F24F 2110/50* (2018.01); *F25B 2309/001* (2013.01); *F25B 2309/002* (2013.01); *F25B 2309/1428* (2013.01); *F25B 2345/001* (2013.01); *F25B 2345/003* (2013.01)

(58) Field of Classification Search
CPC ...... F25B 9/14; F25B 2309/003; F25B 43/00; F25B 2309/002; F25B 9/002; F25B 45/00; F25B 2309/1428; F25B 2345/001; F25B 2345/003; B01D 8/00; F25J 1/0007
USPC ...................................................... 62/6, 55.5
See application file for complete search history.

(56) References Cited

U.S. PATENT DOCUMENTS

| | | | | |
|---|---|---|---|---|
| 4,543,793 A | * | 10/1985 | Chellis | F25B 9/14 60/520 |
| 4,653,280 A | | 3/1987 | Hansen et al. | |
| 4,674,291 A | | 6/1987 | Kitauchi | |
| 4,679,401 A | | 7/1987 | Lessard et al. | |
| 4,782,671 A | | 11/1988 | Breneman et al. | |
| 4,840,043 A | * | 6/1989 | Sakitani | F25B 9/10 250/352 |
| 4,870,830 A | | 10/1989 | Hohenwarter et al. | |
| 4,926,652 A | | 5/1990 | Murata et al. | |
| 4,928,502 A | | 5/1990 | Kumada et al. | |
| 4,951,471 A | * | 8/1990 | Sakitani | F25B 9/10 250/352 |
| 4,958,499 A | | 9/1990 | Haefner et al. | |
| 4,966,016 A | | 10/1990 | Bartlett | |
| 5,010,737 A | | 4/1991 | Okumura et al. | |
| 5,065,591 A | | 11/1991 | Shaw | |
| 5,142,877 A | | 9/1992 | Shimizu | |
| 5,157,928 A | * | 10/1992 | Gaudet | F04B 37/08 417/901 |
| 5,176,004 A | | 1/1993 | Gaudet | |
| 5,265,431 A | | 11/1993 | Gaudet et al. | |
| 5,265,436 A | | 11/1993 | Murata et al. | |
| 5,317,878 A | | 6/1994 | Bradshaw et al. | |
| 5,327,997 A | | 7/1994 | Nash, Jr. et al. | |
| 5,345,787 A | | 9/1994 | Piltingsrud | |
| 5,375,424 A | | 12/1994 | Bartlett et al. | |
| 5,386,708 A | | 2/1995 | Kishorenath et al. | |
| 5,386,709 A | | 2/1995 | Aaron | |
| 5,426,949 A | | 6/1995 | Saho et al. | |
| 5,447,556 A | | 9/1995 | Pleil et al. | |
| 5,487,272 A | * | 1/1996 | Nagao | F25B 9/10 62/196.2 |
| 5,551,248 A | | 9/1996 | Derosier | |
| 5,582,017 A | | 12/1996 | Noji et al. | |
| 5,647,218 A | | 7/1997 | Kuriyama et al. | |
| 5,647,228 A | | 7/1997 | Sager et al. | |
| 5,651,667 A | * | 7/1997 | Sand | B01D 8/00 318/432 |
| 5,687,574 A | | 11/1997 | Longsworth et al. | |
| 5,697,219 A | * | 12/1997 | Nagao | F25B 9/10 62/6 |
| 5,737,927 A | | 4/1998 | Takahashi et al. | |
| 5,765,378 A | | 6/1998 | Stein et al. | |
| 5,775,109 A | | 7/1998 | Eacobacci, Jr. et al. | |
| 5,845,498 A | * | 12/1998 | Matsui | F25B 9/145 62/6 |
| 5,971,711 A | * | 10/1999 | Noji | F04B 37/08 417/2 |
| 6,022,195 A | * | 2/2000 | Gaudet | F04B 37/08 417/27 |
| 6,047,557 A | | 4/2000 | Pham et al. | |
| 6,065,295 A | | 5/2000 | Hafner et al. | |
| 6,109,047 A | | 8/2000 | Cowans et al. | |
| 6,112,126 A | | 8/2000 | Hales et al. | |
| 6,216,467 B1 | * | 4/2001 | O'Neil | F25B 9/14 62/6 |
| 6,233,948 B1 | | 5/2001 | Morishita et al. | |
| 6,272,400 B1 | | 8/2001 | Jankins et al. | |
| 7,127,901 B2 | | 10/2006 | Dresens et al. | |
| 7,555,911 B2 | | 7/2009 | Tanaka | |
| 7,788,942 B2 | | 9/2010 | Dressens et al. | |
| 8,261,562 B2 | | 9/2012 | Dresens et al. | |
| 8,869,552 B2 | | 10/2014 | Dresens et al. | |
| 9,334,859 B2 | | 5/2016 | Dresens et al. | |
| 2003/0014985 A1 | | 1/2003 | Dresens et al. | |
| 2006/0101836 A1 | | 5/2006 | Tanaka | |
| 2007/0107448 A1 | | 5/2007 | Dresens et al. | |
| 2010/0313583 A1 | | 12/2010 | Dresens et al. | |
| 2013/0232999 A1 | * | 9/2013 | Matsui | B01D 8/00 62/55.5 |
| 2014/0260339 A1 | * | 9/2014 | Matsui | F04B 37/08 62/55.5 |

FOREIGN PATENT DOCUMENTS

| | | | |
|---|---|---|---|
| FR | 2 736 423 A1 | 6/1995 | |
| GB | 2 330 426 | 4/1999 | |
| JP | 01-159474 | 6/1989 | |
| JP | 1 159474 | 6/1989 | |
| JP | 03-015676 | 1/1991 | |
| JP | 03070942 A | 3/1991 | |
| JP | 5 45014 | 2/1993 | |
| JP | 5-113259 | 5/1993 | |
| JP | 5 280467 | 10/1993 | |
| JP | 0678857 | † 10/1994 | |
| JP | H06-78857 | 10/1994 | |
| JP | 2507452 | 4/1996 | |
| JP | 8093643 A2 | 4/1996 | |
| JP | 08-15033 | 6/1996 | |
| JP | 11-107915 | 4/1999 | |
| JP | 11-257774 | 9/1999 | |
| JP | 11 257774 | 9/1999 | |
| JP | 11248286 A | 9/1999 | |
| JP | 2993126 | 10/1999 | |
| JP | 2000 9036 | 1/2000 | |
| JP | 2000-009036 | 1/2000 | |
| JP | 2000-121192 | 4/2000 | |
| JP | 2000121192 | † 4/2000 | |
| JP | 2000 161802 | 6/2000 | |
| JP | 2000-249056 | 9/2000 | |
| JP | 2000 249057 | 9/2000 | |
| JP | 2001-099062 | 4/2001 | |
| JP | 2004-003792 | 1/2004 | |
| JP | 2007-303815 | 11/2007 | |

\* cited by examiner
† cited by third party

HELIUM MANAGEMENT CONTROL SYSTEM

RELATED APPLICATION(S)

This application is a is a continuation of U.S. application Ser. No. 14/523,507, filed Oct. 24, 2014, now U.S. Pat. No. 9,334,859, which is a continuation of U.S. application Ser. No. 13/605,738, filed Sep. 6, 2012, now U.S. Pat. No. 8,869,552, which is a continuation of U.S. application Ser. No. 12/848,681, filed Aug. 2, 2010, now U.S. Pat. No. 8,261,562, which is a divisional of U.S. application Ser. No. 11/590,673, filed Oct. 31, 2006, now U.S. Pat. No. 7,788,942, which is a continuation-in-part of U.S. application Ser. No. 09/909,863, now U.S. Pat. No. 7,127,901, filed Jul. 20, 2001. The entire teachings of the above applications are incorporated herein by reference.

BACKGROUND OF THE INVENTION

Vacuum process chambers are often employed in manufacturing to provide a vacuum environment for tasks such as semiconductor wafer fabrication, electron microscopy, gas chromatography, and others. Such chambers are typically achieved by attaching a vacuum pump to the vacuum process chamber in a sealed arrangement. The vacuum pump operates to remove substantially all of the molecules from the vacuum process chamber, therefore creating a vacuum environment.

One type of vacuum pump is a cryopump, such as that disclosed in U.S. Pat. No. 5,862,671, issued Jan. 26, 1999, assigned to the assignee of the present application and incorporated by reference in its entirety. Cryopumps remove molecules from a vacuum process chamber by cooling a surface to temperatures approaching absolute zero. At such temperatures, most all gases condense on the cooled surface, called a cryogenic array, thereby removing substantially all molecules from the vacuum process chamber.

Cryopumps typically employ a helium driven refrigerator to achieve the near absolute zero temperatures required. A compressor is used to compress and pump the helium refrigerant to the cryogenic refrigerator in the cryopump, and a cylindrical shaped vessel called a cold finger in the cryogenic refrigerator receives the helium. A cryogenic array is attached to and in thermal communication with the cold finger and cooled therewith. A displacer reciprocates inside the cold finger as the helium expands, driven by a displacer drive motor which reciprocates the displacer and regulates the quantity of helium used. As the helium expands in the cold finger, heat is drawn off the cryogenic array, generating the near absolute zero temperatures required to condense gases on the cryogenic array.

The amount of helium refrigerant available to the cryogenic refrigerator determines the rate at which cooling occurs. A greater supply of helium decreases the amount of time required for cooldown, which is the time required to achieve cryopumping temperatures. The rate of helium consumption also varies with the temperature of the cryogenic refrigerator. As the cryogenic refrigerator becomes colder, a greater supply of helium is required to continue the cooling process. In a cryopumped vacuum process chamber, downtime can result in substantial economic impact, due to lost manufacturing time. Accordingly, the capability to rapidly achieve and maintain cryopumping temperatures is beneficial.

One prior art type of helium distribution is described in U.S. Pat. No. 5,775,109, entitled "Enhanced Cooldown of Multiple Cryogenic Refrigerators Supplied by a Common Compressor," filed Jan. 2, 1997 and assigned to the assignee of the present application, incorporated herein by reference in its entirety. This patent suggests individually monitoring the temperature of each of a plurality of cryopumps to control the speed of each displacer drive motor when a cryopump attains a triggering temperature. As cryopumps require varying amounts of helium depending upon the operation currently being performed, regulating the drive motor speed can reduce or increase the helium supply accordingly. In this system, each cryopump monitors temperature and controls the drive motor speed accordingly.

Frequently, however, a common helium supply manifold supplying a plurality of cryopumps is capable of supplying more helium than required by all of the cryopumps. Excess helium which is not identified is often unutilized, which can increase the time required for cooldown and which can cause a cryogenic refrigerator to become colder than needed, wasting power and other resources required to maintain the helium refrigerant supply.

SUMMARY OF THE INVENTION

A method for controlling distribution of a resource, such as refrigerant, among a plurality of consumers, such as refrigerators, is provided by computing an available quantity of the refrigerant and computing a demand of the refrigerant by each of the plurality of refrigerators. The demand from the users is aggregated, and an allocation of the refrigerant based on the aggregated demand is determined for each of the refrigerators. Periodically, at regular intervals, the allocation of the refrigerant is redistributed by recomputing the demand of each of the users by reevaluating a current need of each of the refrigerators.

In a system such as a cryogenic refrigeration system, the method of controlling includes a compressor bank having at least one compressor and a plurality of cryogenic refrigerators supplied with refrigerant from the compressor bank. Management of the refrigerant supply from the compressors to each of the cryogenic refrigerators is performed by identifying the refrigeration requirements of each of the refrigerators, and, from a vacuum network controller, allocating a supply of refrigerant to the refrigerators according to the identified requirements.

An embodiment of the helium management control system for controlling the helium refrigerant supply from a common manifold supplies a plurality of cryogenic refrigerators with an appropriate helium supply. The system employs a plurality of sensors to monitor and regulate the overall refrigerant supply to deliver a refrigerant supply to each of the cryogenic refrigerators depending on the aggregate cooling load of all of the cryogenic refrigerators. Refrigerant demand for each of the cryogenic refrigerators is computed by the corresponding cryopump. The total refrigeration capacity of the helium supply is apportioned to each of the cryogenic refrigerators to optimize the refrigerant delivery. An appropriate supply of helium is distributed to each cryopump by sensing excess and sparse helium refrigerant and distributing the refrigerant accordingly. If the total refrigeration supply exceeds the total refrigerant demand, excess refrigerant is directed to cryogenic refrigerators which can utilize the excess helium. Similarly, if the total refrigeration demand exceeds the total refrigeration supply, the refrigerant supply to some or all of the cryogenic refrigerators will be reduced accordingly so that detrimental or slowing effects are minimized.

The refrigerant supply may be delivered from one or more compressors, or common compressor bank, to a plurality of cryogenic refrigerators via a helium supply manifold. The refrigerant supply from each compressor comprising the common compressor bank is used to determine the refrigerant supply. The total refrigerant demand, computed based on data from sensors attached to each of the cryopumps containing the cryogenic refrigerators, is also computed depending on the particular operation that the cryogenic refrigerator is performing. As certain operations may consume more refrigerant than others, a refrigerant supply is computed for each of the cryogenic refrigerators. A cooldown function requires the most helium, and therefore will be afforded the maximum refrigerant supply that can be delivered without disturbing other cryogenic refrigerators. A regeneration function requires little or no refrigerant, and therefore will free up refrigerant for other cryogenic refrigerators. During normal operation of one or more cryogenic refrigerators, helium is delivered to attempt to keep the cryogenic refrigerator in a state of equilibrium. Excess helium can be delivered to cryogenic refrigerators in a cooldown state, or the total refrigerant supply can be reduced if there is no demand for excess helium.

A variety of parameters are monitored by the system to compute the appropriate refrigerant supply for each cryogenic refrigerator. Such parameters include computed refrigerant flow rate through the cryogenic refrigerator, the speed of the drive motor, the pressure of the refrigerant, and the temperature of the cryogenic refrigerator. In this manner, an appropriate refrigerant supply can be delivered to a plurality of cryogenic refrigerators from the common compressor bank depending on the aggregate refrigerant load and the current cooling function of the individual cryogenic refrigerators. Therefore, the helium management control system can minimize detrimental or slowing effects from a sparse refrigerant supply and increase performance in the case of an excess of refrigerant supply.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
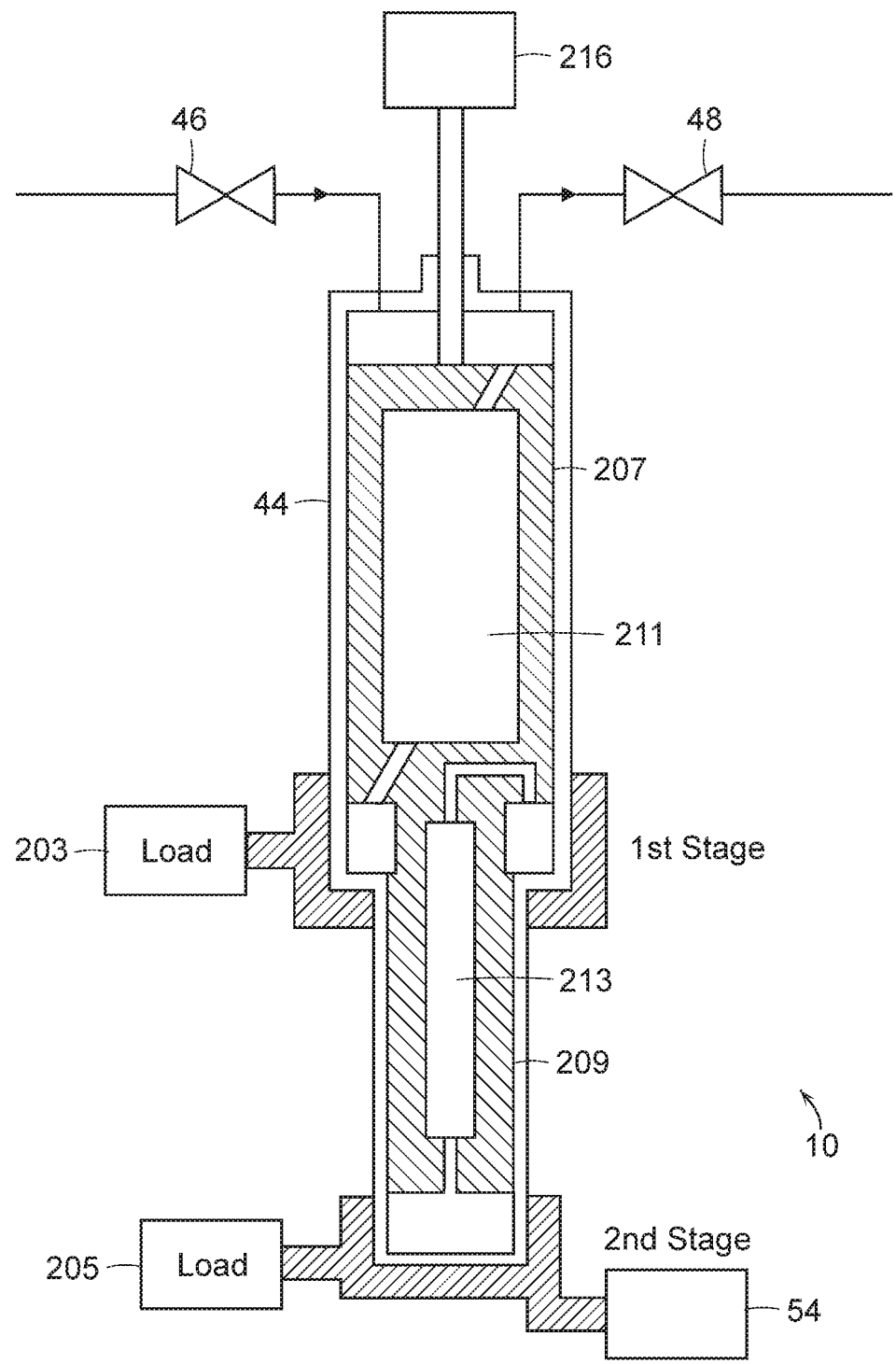
FIG. 1a is a schematic illustration of a typical prior art cryogenic refrigerator

A description of example embodiments of the invention follows.

Prior to discussing helium management control, a discussion of cryopump (pump) operation may prove beneficial. Vacuum pumps such as cryopumps and water pumps are used to drive a vacuum process chamber to near zero pressure. Near zero pressure, on the order of $10^{-6}$ to $10^{-9}$ torr or even lower, is achieved by removing substantially all the molecules from the vacuum process chamber. The molecules are removed from the vacuum process chamber via the cryogenic refrigerator in the cryopump. A portion of the cryogenic refrigerator is cooled to near absolute zero, typically between 10K-20K, causing substantially all of the molecules in the process chamber to condense on the cryogenic array which is cooled by the cryogenic refrigerator. The cryogenic array is typically a set of louvers and baffles which provide a surface area in a compact volume. The condensed gases are therefore reduced to a solid with a low vapor pressure so that a near vacuum is created. Further, the cryogenic array may include an adsorbent substance, such as charcoal, to adsorb molecules which do not condense, such as hydrogen, helium, and neon. The cryogenic refrigerator is powered by a refrigerant working fluid such as helium gas, capable of achieving the temperatures approaching absolute zero.

Cryopumps consume varying amounts of helium depending upon their current operation and temperature. A series of pumps are connected to a common compressor bank of one or more compressors to maximize the available helium supply. Helium consumption by the pumps is monitored and regulated by a controller. By monitoring various operating parameters of each of the pumps, an appropriate supply of helium is supplied to each pump. Excess helium is redirected to benefit pumps which can utilize it. Sparse helium is rationed so as to maintain operation and minimize detrimental effects.

In the refrigerator of a typical cryopump, the working fluid is compressed; the heat of compression is removed by air-cooled heat exchangers; the fluid is further cooled in a regenerative heat exchange matrix; and the gas is then expanded to produce cooling below the ambient temperature. A cryopump must operate effectively at less than 20K to remove gas molecules from the vacuum process chamber. Achieving this low temperature requires the use of highly efficient heat exchangers and a working fluid such as helium gas that remains gaseous at temperatures approaching absolute zero.

The flow of compressed gas refrigerant in the cryogenic refrigerator of a pump is cyclic. In the most basic form of a cryogenic refrigerator, a source of compressed gas, i.e., a compressor, is connected to a first end of a cylinder through an inlet valve. An exhaust valve in an exhaust line leads from the first end to the low-pressure inlet of the compressor. With a displacer including a regenerator positioned at a second, cold end of the cylinder, and with the exhaust valve closed and the inlet valve open, the cylinder fills with compressed gas. With the inlet valve still open, the displacer moves to the first end to force the compressed gas through the regenerator to the second end, the gas being cooled as it passes through the regenerator. When the inlet valve is closed and the exhaust valve is opened, the gas expands into the low-pressure discharge line and cools further. The resulting temperature gradient across the cylinder wall at the second end causes heat to flow from the load into the gas within the cylinder. With the exhaust valve opened and the inlet valve closed, the displacer is then moved to the second end, displacing gas back through the regenerator which returns heat to the cold gas, thus cooling the regenerator, and the cycle is completed. In a typical pump, the cylinder is called a cold finger and it has a first stage and a second stage.

To produce the low temperatures required for cryopump operations, the incoming gas must be cooled before expansion. The regenerator extracts heat from the incoming gas, stores it, and then releases it to the exhaust stream. A regenerator is a reversing-flow heat exchanger through which the helium passes alternately in either direction. The regenerator comprises a material of high surface area, high specific heat, and low thermal conductivity. Thus, the regenerator will accept heat from the helium if the temperature of the helium is higher. If the temperature of the helium is lower, the regenerator will release heat to the helium.

FIG. 1a shows a block diagram of the cryogenic refrigerator 10 internals. In the device of FIG. 1a, helium enters the cold finger of the refrigerator through a high pressure valve 46 and exits through a low pressure valve 48. A displacer drive motor 216 drives displacers 207 and 209 in the first stage and second stage of the cryogenic refrigerator, respectively. The first stage displacer 207 includes a first regenerator 211, and the second stage displacer 209 includes a second regenerator 213. Heat is extracted from first-stage thermal load 203, such as a cryopump radiation shield and frontal array, and second-stage load 205, such as a 10K-20K cryopanel.

Figure 1B:
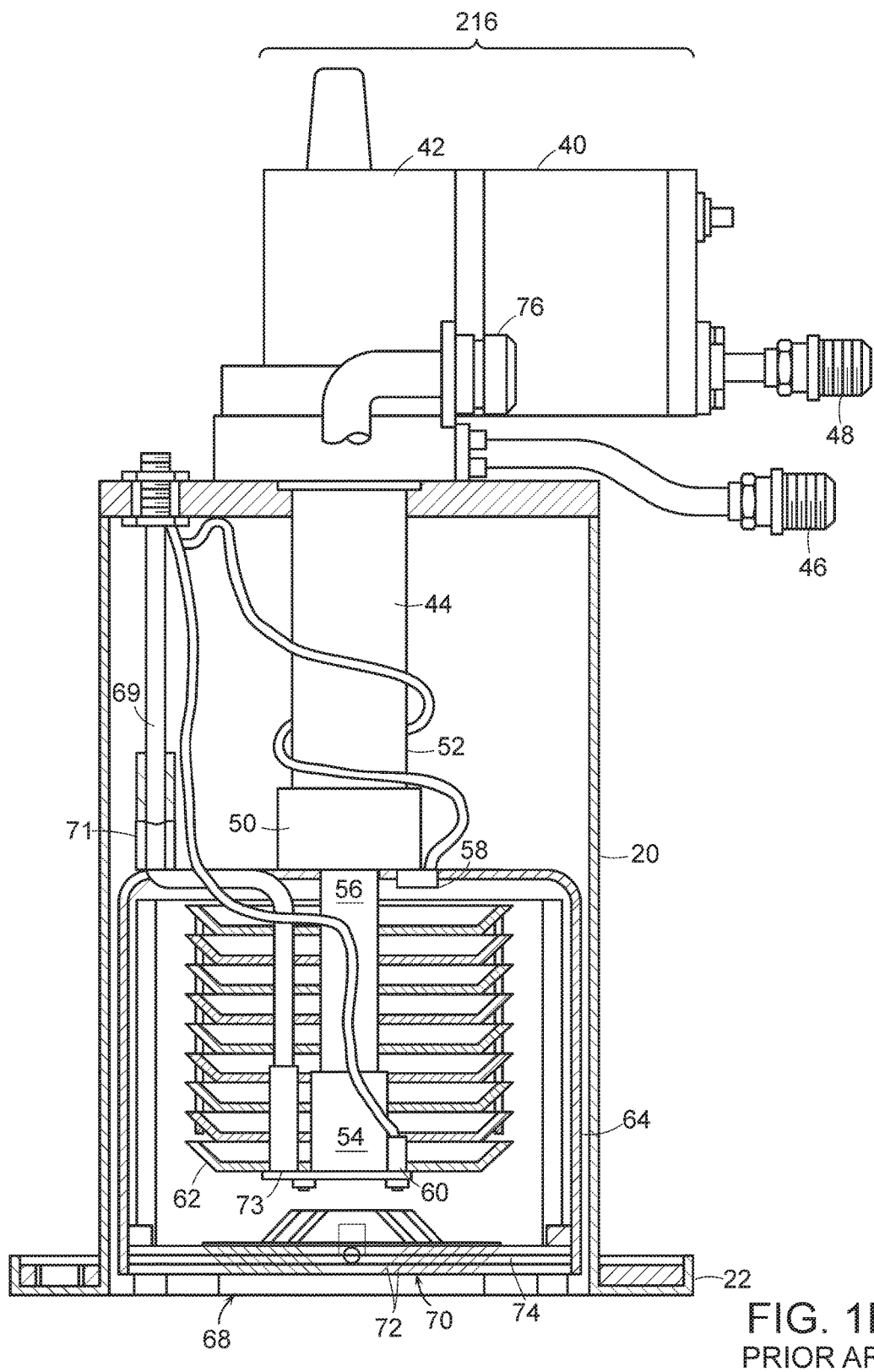
FIG. 1b shows a cutaway view of a typical prior art cryopump including the cryogenic refrigerator of FIG. 1.

FIG. 1b shows a cutaway view of a cryopump including a cryogenic refrigerator. In FIG. 1b, the pump housing is removed to expose a displacer drive 40 and a crosshead assembly 42. The crosshead converts the rotary motion of the motor 40 to reciprocating motion to drive a displacer within the two-stage cold finger 44. With each cycle, helium gas introduced into the cold finger under pressure through line 46 is expanded and thus cooled to maintain the cold finger at cryogenic temperatures. Helium then warmed by a heat exchange matrix in the displacer is exhausted through line 48.

A first-stage heat station 50 is mounted at the cold end of the first stage 52 of the refrigerator. Similarly, heat station 54 is mounted to the cold end of the second stage 56. Suitable temperature sensor elements 58 and 60 are mounted to the rear of the heat stations 50 and 54.

The primary pumping surface is a cryogenic array 62 mounted to the heat sink 54. This array comprises a plurality of disks as disclosed in U.S. Pat. No. 4,555,907, incorporated by reference in its entirety. Low temperature adsorbent is mounted to protected surfaces of the array 62 to adsorb noncondensible gases.

A cup-shaped radiation shield 64 is mounted to the first stage heat station 50. The second stage of the cold finger extends through an opening in that radiation shield. This radiation shield 64 surrounds the primary cryopanel array to the rear and sides to minimize heating of the primary cryopanel array by radiation. The temperature of the radiation shield may range from as low as 40K at the heat sink 50 to as high as 130K adjacent to the opening 68 to an evacuated chamber.

A frontal cryopanel array 70 serves as both a radiation shield for the primary cryopanel array and as a cryopumping surface for higher boiling temperature gases such as water vapor. This panel comprises a circular array of concentric louvers and chevrons 72 joined by a spoke-like plate 74. The configuration of this cryopanel 70 need not be confined to circular, concentric components; but it should be so arranged as to act as a radiant heat shield and a higher temperature cryopumping panel while providing a path for lower boiling temperature gases to the primary cryopanel.

Figure 2:
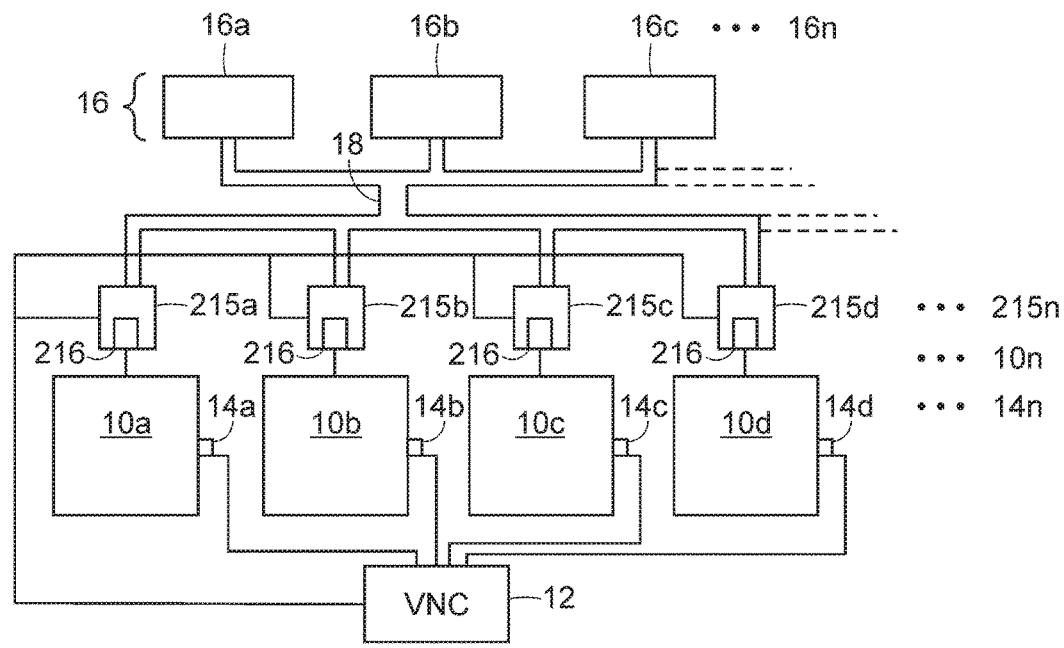
FIG. 2 shows a block diagram of a cryogenic refrigeration system master controller connected to a plurality of cryopumps and compressors.

FIG. 2 shows a bank of compressors used to supply helium refrigerant to a series of pumps. Referring to FIG. 2, the common compressor bank 16 includes compressors 16a-16n which supply helium refrigerant to a manifold 18. The manifold 18 is connected to a series of pumps 10a-10n in conjunction with the slave controllers 215a-215n. The slave controllers each control a displacer drive motor 216 which drives a displacer which reciprocates in the cold finger as the helium gas expands. The displacer drive motor is used to regulate the cooling rate of the pump by the quantity of helium supplied. The vacuum network master controller 12 (controller), or VNC, is connected to each of the slave controllers controlling the displacer driver motors 216 and is used to increase or decrease the quantity of helium refrigerant supplied to the pump 10. Each of the pumps 10 has one or more sensors 14a-14n which provide feedback to the controller 12. The controller 12 therefore regulates all the pumps 10 connected to it by receiving signals from the sensors 14 and computing a helium quantity for each pump 10 based on the signals sent from the sensors 14 and from the total helium available from the manifold, as will be described in more detail below.

It should be noted that the helium management control system is described in conjunction with an exemplary cryogenic refrigerator in a cryopump. The helium management control system may be used in conjunction with a helium supply driving a variety of cryogenic refrigerators. A cryopump as described herein may, for example, be a waterpump, cooled by a single stage cryogenic refrigerator, such as that disclosed in U.S. Pat. No. 5,887,438, entitled "Low Profile In Line Cryogenic Water Pump," incorporated by reference in its entirety, and assigned to the assignee of the present application, or other helium driven cryogenic device.

Depending on the cooling operation of the pump, varying helium consumption rates occur. A cooldown operation brings the temperature of the pump from an ambient state down to the cryogenic temperatures, and requires the most helium. Once cryogenic temperatures have been achieved, a normal operating mode maintains the temperature and requires a generally stable flow of helium. A regeneration operation warms up the pump to release accumulated, condensed gas and requires little or no helium. Other factors can affect the helium consumption rate. During cooldown, the pump gradually consumes more helium as it becomes colder, approaching normal operating temperatures. At normal operating temperatures, vacuum process activities occurring in an attached vacuum process chamber may generate heat, increasing the refrigeration load, and in turn increasing the helium consumption rate.

The aggregate helium delivery rate of all the pumps connected to the common refrigerant supply can be used to determine an aggregate cooling demand. Similarly, the refrigerant capacity of the compressor or compressors contributing to the common refrigerant supply can be used to determine a refrigerant capacity of the system. As indicated above, the actual consumption rate of each pump varies depending on a variety of factors. At a particular point in time, the refrigerant capacity of the system may exceed the aggregate refrigeration load, indicating excess helium in the system. Similarly, if many pumps are experiencing a period of high helium consumption, the aggregate refrigeration load may exceed the refrigerant capacity, indicating helium sparsity.

By monitoring the current operation of all the pumps and the total refrigerant capacity, excess helium can be identified and diverted to pumps which can utilize it. Similarly, sparse helium can be apportioned appropriately to maintain normal operation, or mitigate harmful effects in extreme situations. For example, a cooldown operation can consume the most helium, and therefore the time required for cooldown can be reduced by diverting excess helium to pumps in cooldown. A pump in a regeneration operation requires little or no helium, and therefore can result in excess helium being present. Also, a pump in normal operation may begin to rise in temperature. In order to maintain cryopumping temperatures, helium may be diverted from a pump in cooldown, increasing cooldown time, but preserving cryopumping temperatures in the pump which had begun to warm up, to allow it to continue normal operations.

Figure 3:
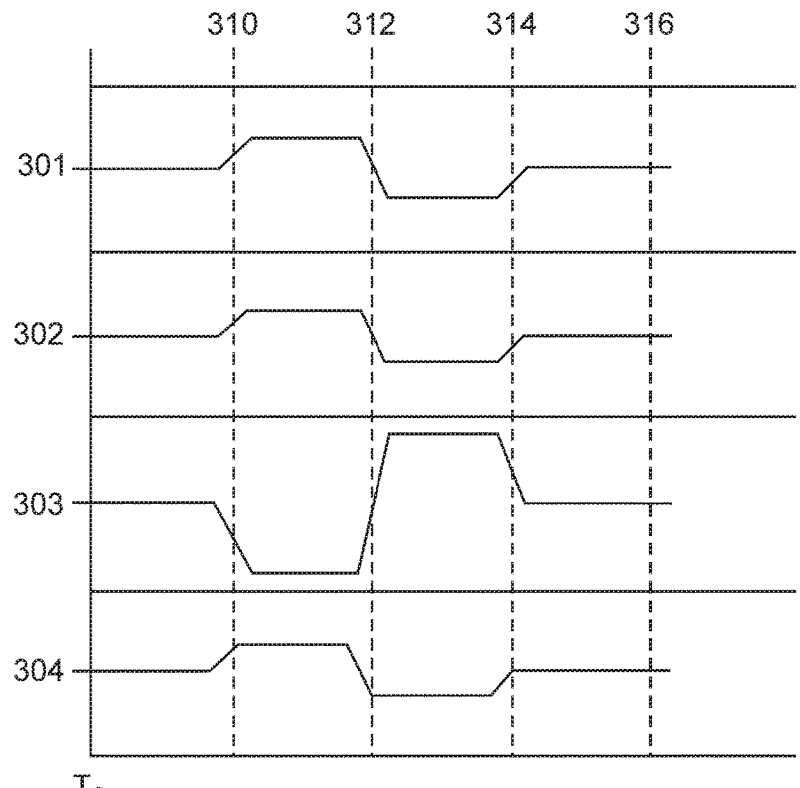
FIG. 3 shows an example of helium refrigerant flow rate over time.

FIG. 3 shows an example of helium distribution flow rate over time. Each of four pumps, 301-304 is shown over time shown by a horizontal axis. At an initial time, all pumps are consuming equally. At the time shown by dotted line 310, pump 303 enters a regeneration state and warms up. Accordingly, additional helium can be provided to pumps 301, 302, and 304. Alternatively, the drive motor speed of pumps 301, 302, and 304 could be reduced to lower the overall helium draw from the common compressor bank, if increased helium would be inefficient. At the time shown by the dotted line 312, the pump 303 has completed regeneration warmup and enters a cooldown state. Excess helium is therefore redirected from pumps 301, 302, and 304 to accelerate the cooldown of pump 303. At the time shown by the dotted line 314, cryopump 303 has completed cooldown and all pumps return to an equal consumption rate at the time shown by dotted line 316.

Figure 4:
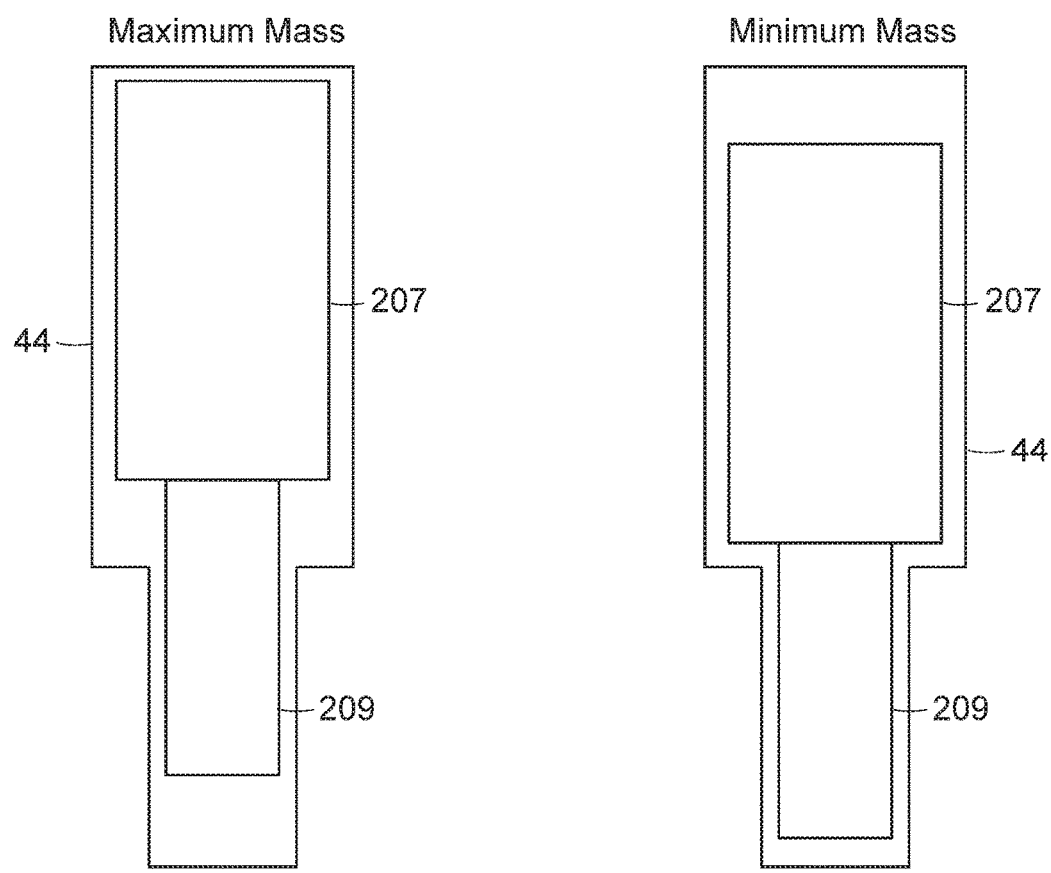
FIG. 4 shows a diagram of the helium consumption model used to determine the quantity of helium a cryogenic refrigerator can consume.

Helium consumed by the cryopumps is typically expressed in terms of units of mass flow rate, such as standard cubic feet per minute (SCFM), at a particular temperature and pressure. Other unit may also be used to denote the mass flow rate, such as grams/second. The helium consumed is determined from the maximum and minimum helium mass which is present in the cold finger as the displacer reciprocates in a cyclic manner. FIG. 4 illustrates the displacer positions for minimum and maximum helium masses within the cold finger 44 in computing helium consumption rates for a cryogenic refrigerator in a cryopump. A displacer having a first stage and a second stage 207 and 209, respectively, reciprocates through the interior of the cold finger 44. As the displacer is reciprocated by the drive motor 215, the helium is caused to expand, cooling the cold finger. Each displacer cycle also opens the high pressure 46 (supply) and low pressure (exhaust) 48 lines to draw in unexpanded helium and exhaust expanded helium. The amount of helium which is consumed is given by the formula:

$$\text{Flow Rate} = (\text{Maximum Mass} - \text{Minimum Mass}) * \text{Speed of Drive Motor}$$

Therefore, as the speed of the drive motor increases, the helium consumed increases because of increased displacer cycles, thereby drawing additional heat from the load.

For example, if a common compressor bank can deliver 84 SCFM of helium, the compressor bank could supply six refrigerators with 14 SCFM of helium: 84/6=14. As indicated above, the helium consumed by a pump can vary. If four of the refrigerators are only consuming 12.5 SCFM of helium, then there is 12.5*4, or 50 SCFM of refrigerant load from those four refrigerators. Since the compressor can supply 84 SCFM, there is 84-50, or 34 SCFM for the remaining two refrigerators. If the remaining two refrigerators are in a cooldown state, they can each be supplied with 34/2, or 17 SCFM of helium due to the excess in the system. In alternate embodiments, refrigerators in cooldown need not be apportioned an equal share of the excess helium.

Figure 5A:
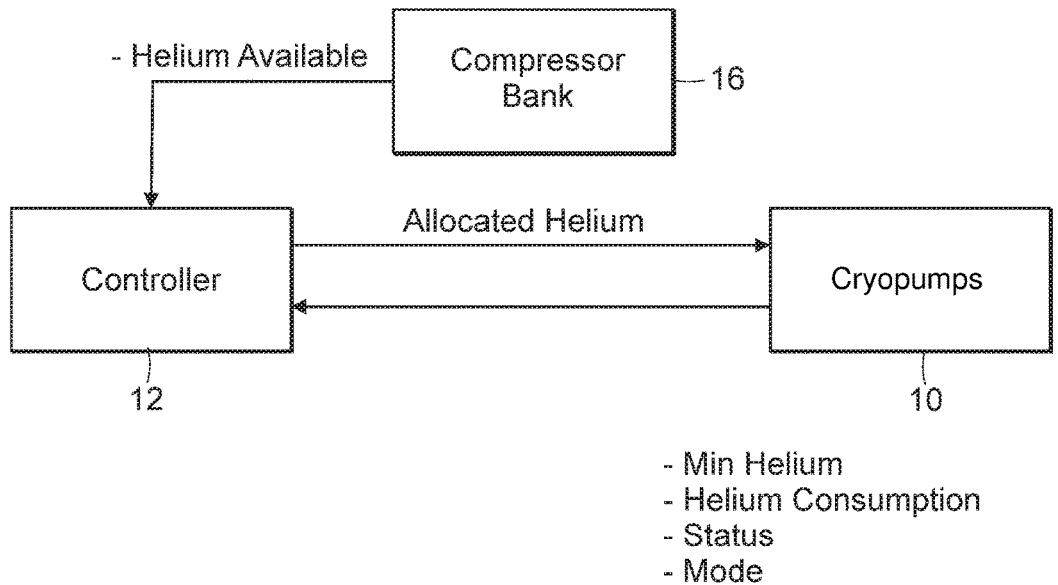
FIG. 5a shows a block diagram of the data and control flow of one embodiment of the present invention.

FIG. 5A shows a block diagram of the data flow of an embodiment of the helium management control system. Referring to FIG. 5A, each of the compressors in the common compressor bank 16 sends an indication of the maximum helium available from each compressor to the controller 12, allowing computation of an aggregate helium supply. Each of the pumps 10 sends the following parameters to the controller: a minimum helium quantity, a current computed helium consumption rate, an operating mode, and a helium consumption status indicative of helium starvation. The controller 12 sends an allocated helium parameter, or value, to the pumps indicative of the maximum helium rate at which the pump can consume. The maximum helium consumption signal is used to regulate the displacer drive motor via the slave controller 215 connected to the particular cryogenic refrigerator. As indicated above, the speed of the displacer drive motor regulates the helium consumption of the pump.

Figure 5B:
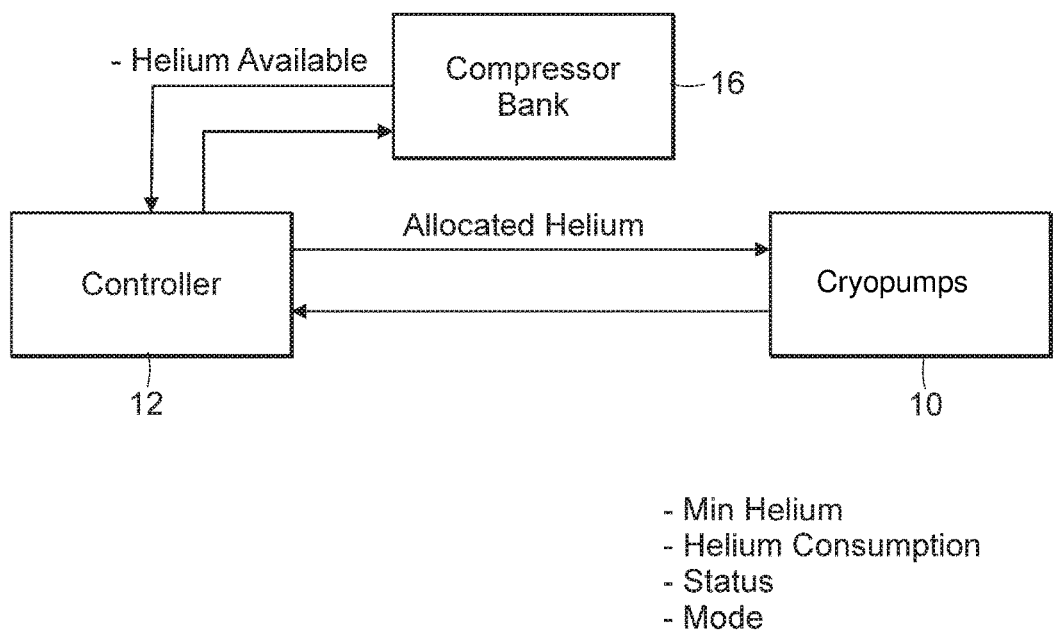
FIG. 5b shows a block diagram of the data and control flow of another embodiment of the present invention.

FIG. 5B shows a block diagram of the dataflow of another embodiment of the helium management control system. Similar to the system of FIG. 5A, each of the compressors in the common compressor bank 16 sends an indication of the maximum helium, or other refrigerant, available from each compressor to the controller 12, allowing computation of an aggregate helium supply. Each of the pumps 10 sends the following parameters to the controller: a minimum helium quantity, a current computed helium consumption rate, an operating mode, and a helium consumption status indicative of helium starvation. The controller 12 is configured to send an allocated helium parameter, or value, to the pumps indicative of the maximum helium rate at which the pump can consume. In the system shown in FIG. 5B, the controller may also send an indication to the compressor banks which may comprise variable speed compressors. Based on the indication, the compressors 16 may vary the supply of refrigerant to the cryopumps 10, whereby controlling the consumption of the refrigerant by the refrigerators. For example, the speed of the compressors 16 may regulate the helium supply available to the cryopumps 10 based on the parameters sent from the pumps 10 to the controller 12.

One of ordinary skill in the art will understand that refrigerant consumption of each pump 12 in FIGS. 5A and 5B may be varied by a number of methods, including adjusting the speed of the displacer drive motor, adjusting the length of the displacer stroke, adjusting the location of the displacer stroke, adjusting the displacer motion profile (displacer position as a function of time) or altering the inlet valve timing to throttle the refrigerant supply. Further, with respect to FIG. 5B, one of ordinary skill will understand that the allocation of the refrigerant supply from the compressors may be varied by different methods, including altering the number of compressors providing refrigerant to the cryopumps, adjusting the compressor speed, altering the swept volume of the compressors, or throttling distribution valves.

Figure 6:
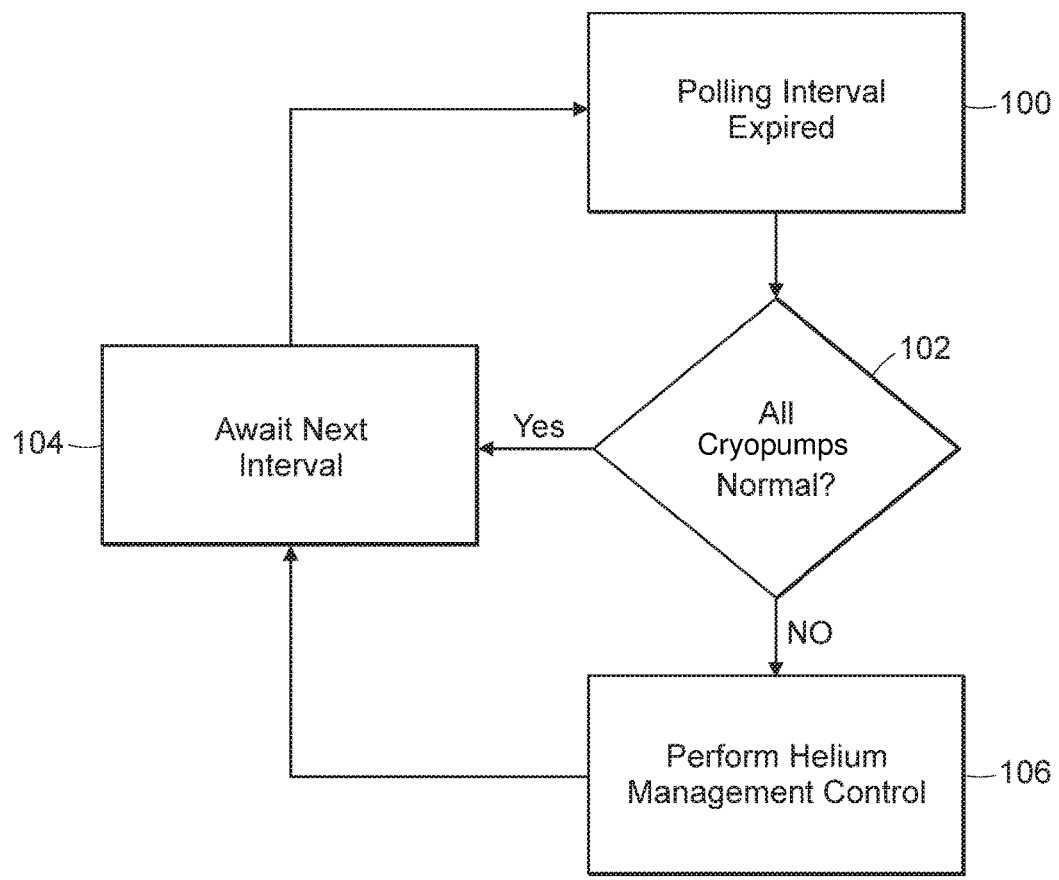
FIG. 6 shows a top level flowchart of the system master controller.

FIG. 6 shows a top level flowchart of control flow in the helium management control system. The system polls, at a regular interval, to determine if the helium supply to any of the cryopumps needs to be regulated. Alternatively, the system could be interrupt, or event, driven. When the polling interval expires, as shown at step 100, a check is made to determine if all cryopumps are operating normally, as depicted at step 102. If all pumps are operating normally, the system awaits the next polling interval, as depicted at step 104. If any of the pumps or the system is not operating normally, that is, if one or more of the pumps has reached a limit of allowed consumption, or if the system differential pressure (DP) has decreased below a critical value, then helium management control is performed, described further below, as shown at step 106. Two embodiments of helium management control are described below.

Figure 7:
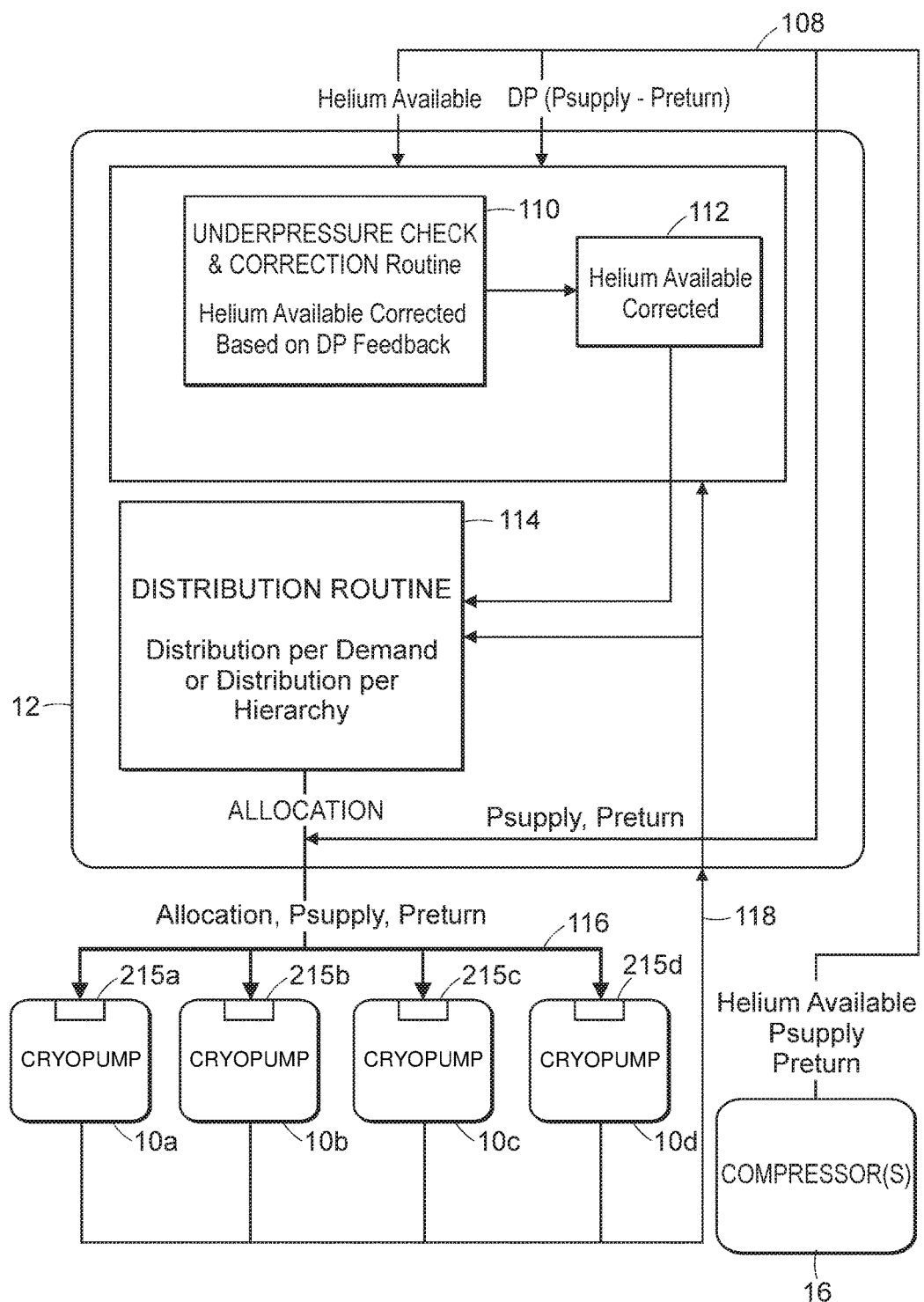
FIG. 7 shows a block diagram of the data flow between the master controller, the compressors, and the cryopumps.

FIG. 7 shows a block diagram of data flow between the vacuum network controller (VNC 12), or master controller, the compressor(s) 16, and the slave controllers 215a-215d at the pumps 10a-10d. The compressor sends the supply pressure, and the return pressure to the VNC 12. The compressor also sends an initial value of the helium which it can supply in standard cubic feet per minute (SCFM). An underpressure check routine 110 in the VNC, described further below with respect to FIG. 10, computes a helium available corrected 112 value. The helium available corrected value is periodically recomputed to approximate how much helium is available for allocation based on current consumption. This value may vary slightly around the rated supply value based on compressor displacement and speed because of factors such as wear and tear and efficiency of the pumps 10 and compressors 16. The helium available corrected 112 value is used in a distribution routine 114, described further below with respect to FIG. 11.

The computed, allocated helium value is sent to the slave controller 215a-215d controlling each pump 10a-10d, as shown by arrow 116. The slave controller determines a maximum displacer motor speed at which the displacer motor may run without exceeding the allocated helium value. A pump speed control loop in the slave controller also controls displacer motor speed as a function of the cryopump temperature, and may run the motor at a lower speed, but may not exceed the speed corresponding to the allocated helium value. The pump speed control loop also allows the pump to freely consume helium up to a default allocation value, according to the temperature, in a stand-alone mode if it is not driven by the VNC 12. The slave controller 215 then computes a helium consumption value indicative of the actual helium consumption, described further below. As with the total helium available value, the helium consumption value may differ from the rated displacement value for the pump depending on factors such as the current operating conditions and wear and tear. The helium consumption value is sent back to the VNC 12 for use in successive helium allocation computations, as shown by arrow 118.

Figure 8:
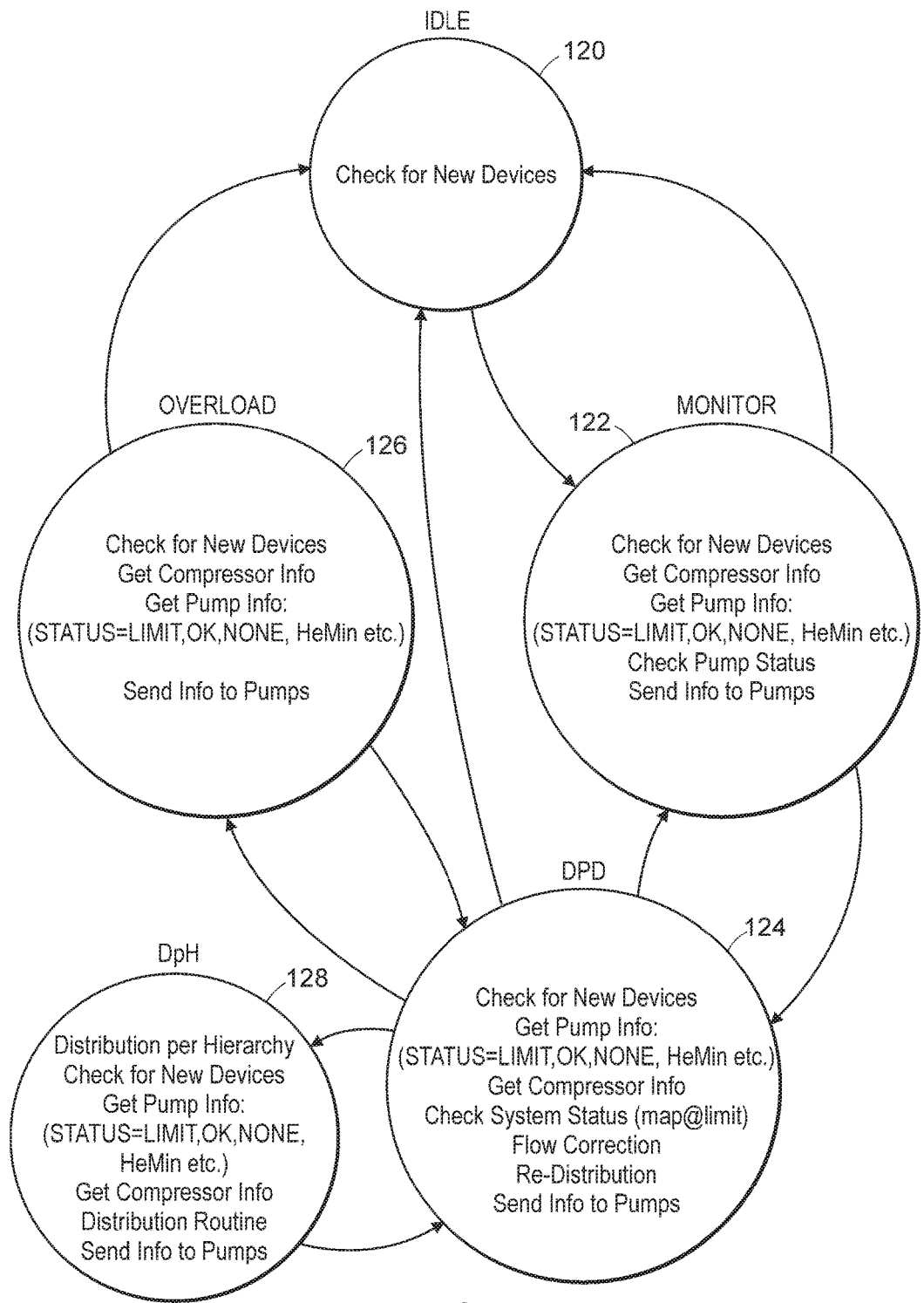
FIG. 8 shows a state diagram of the master controller.

FIG. 8 shows a state diagram of the VNC 12. Referring to FIGS. 6, 7 and 8, a state transition may occur at each polling interval 100 depending on the operation of the system. An idle state 120 occurs during system startup and mapping, and performs initial readings and default values prior to starting the pumps 10 and compressors 16. An initial size check is also performed to ensure that the compressors are adequately sized for the pumps 10 connected to the manifold. When at least one pump 10 and one compressor 16 are started, the VNC 12 transitions to a monitor state 122.

In the monitor state 122, the pumps 10 are polled by the VNC at each polling interval 100 to determine if any pumps 10 are operating at a limit status, described further below. A pump 10 operating at limit status is consuming at or near its maximum allowed consumption, and may need more helium to avoid warming up. A transition to the distribution per demand state 124 occurs when at least one pump 10 is reporting a limit status or when DP has dropped below a critical value. Distribution per demand 124 attempts to reallocate excess helium in the system in order to provide more helium to pumps 10 at limit, described further below with respect to FIG. 9. If distribution per demand 124 cannot reallocate sufficient helium to bring the pumps 10 out of limit status such that DP is still low, the system will transition to either an overload state 126 or a distribution per hierarchy state 128.

In the overload state 126, the VNC 12 will maintain the current allocation to each pump because it has already reallocated as much helium as possible to overconsuming pumps. For example, if five of six pumps are operating adequately, but a sixth is overconsuming due to a faulty bypass valve, reallocating more helium to the defective pump will only deprive the other five operational pumps. The distribution per hierarchy state 128, on the contrary, pursues a more aggressive approach, and selectively shuts down pumps 10 according to a user specified hierarchy. For example, if a pump is in cooldown, it may be beneficial to terminate the cooldown operation to avoid compromising another pump which is currently active with a wafer payload, to trade downtime with saving the payload. Since, however, the distribution per hierarchy allows the VNC to actually terminate operations, a user may not want this feature enabled.

Figure 9:
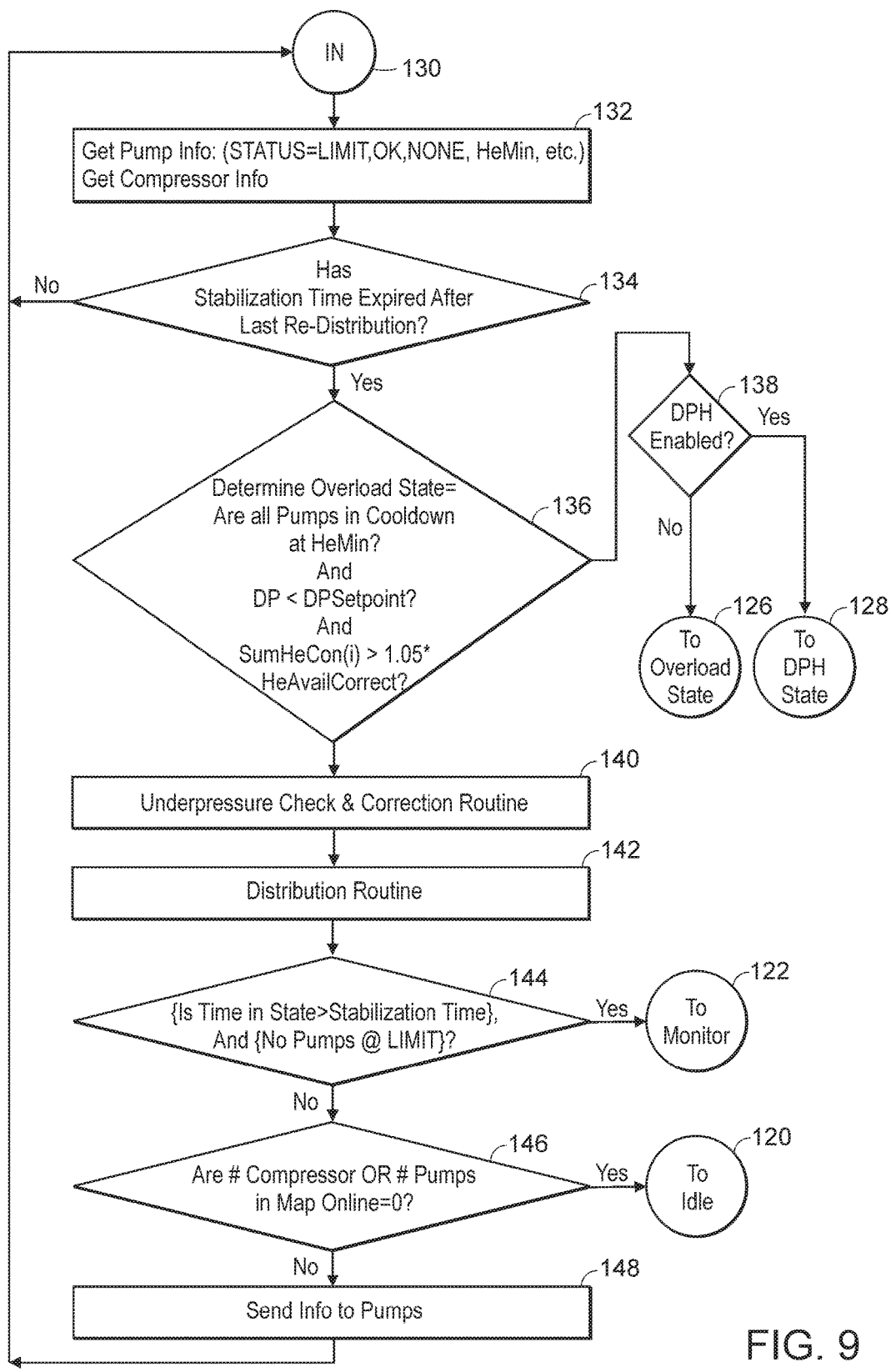
FIG. 9 shows a flowchart of operation in the distribution per demand state.

FIG. 9 shows a flowchart of the computations performed in the distribution per demand state 124. Referring to FIG. 9, the distribution per demand state is entered, as shown at step 130. Each of the pumps 10 and compressors 16 is polled to determine the current operating parameters, as shown at step 132. The supply pressure and return pressure are received, and is the same for all compressors connected to the common manifold. The pump operating parameters include the current computed helium consumption value, the current helium allocation value, the consumption state (status), either OK or limit, the current cooling mode, either "ON" (refrigerator running, temperature control function on or running in manual override of temperature control), "COOLDOWN" (refrigerator running to achieve a setpoint temperature), or "OFF" (refrigerator not running and not consuming helium), and the minimum helium which the pump needs to operate. The cooling mode indicates the current cooling operation being performed by the pump, and is set to cooldown during a cooldown, temperature control when the pump is being controlled by the VNC, and "none" when the pump does not require any helium, such as during a regeneration operation.

A check is performed to determine if a stabilization time has expired since the last redistribution, as depicted at step 134. The stabilization timer indicates how much time will be given to determine if a previous reallocation was effective, typically one minute. If the stabilization timer has not expired, control reverts to step 130 to wait for the next polling interval. If the stabilization timer has expired, or if no stabilization timer has been set, then a check is performed to determine if either the overload or distribution per hierarchy (DPH) states should be entered, as depicted at step 136. Overload or DPH will be entered if an underpressure condition exists, the system is still overconsuming, and all pumps in cooldown are operating at their minimum helium allocation value. An underpressure condition exists if DP obtained in step 132 is below a particular setpoint threshold, typically 190 lbs/in$^2$. As described above, a typical operating DP is about 200 lbs/in$^2$, corresponding to a supply and return pressure of 400 and 200 lbs/in$^2$, respectively.

The system is overconsuming when the sum of the computed helium consumption from all pumps is greater than the current, or most recently computed, helium available corrected 112 (FIG. 7) value. In a particular embodiment, the pumps are overconsuming when the sum of computed helium consumption exceeds the helium available corrected 112 by 5%.

The third condition is that all pumps reporting a cooldown mode are already at their minimum helium allocation as reported in step 132. The system will tend to drive down the allocated helium parameter for pumps in cooldown to allow more helium for pumps in temperature control, until the minimum helium allocation is reached. When all pumps have reached the minimum helium allocation, there is no excess helium to apportion to other pumps.

If the pumps in cooldown are all at minimum helium, and the underpressure and overconsuming checks are positive, then a check is performed to determine if DPH is set up and enabled, as shown at step 138. If DPH is set up and enabled, then the DPH state 128 is entered, otherwise overload state is 126 entered.

If the system does not yet need to transition to overload 126 or DPH 128, the underpressure check routine 140 is entered to compute a new value for the helium available corrected, described further below with respect to FIG. 10. The distribution routine, also described further below, is then entered, as disclosed at step 142. The distribution routine recomputes a new allocated helium value for each of the pumps 10. A check is performed to determine if the system has redistributed helium sufficiently to allow the state to transition to monitor 122, as shown at step 144. If the stabilization timer has elapsed and no pumps are reporting a limit condition, than the VNC transitions to the monitor state 122 since none of the pumps are deprived of sufficient helium. Next, a check is performed to determine if all compressors or all pumps have been shut off, as depicted at step 146. If there are either no compressors or no pumps turned on, the system transitions to the idle state 120. Finally, the newly computed values for helium allocation are sent to the pumps 10, as disclosed at step 148.

Figure 10:
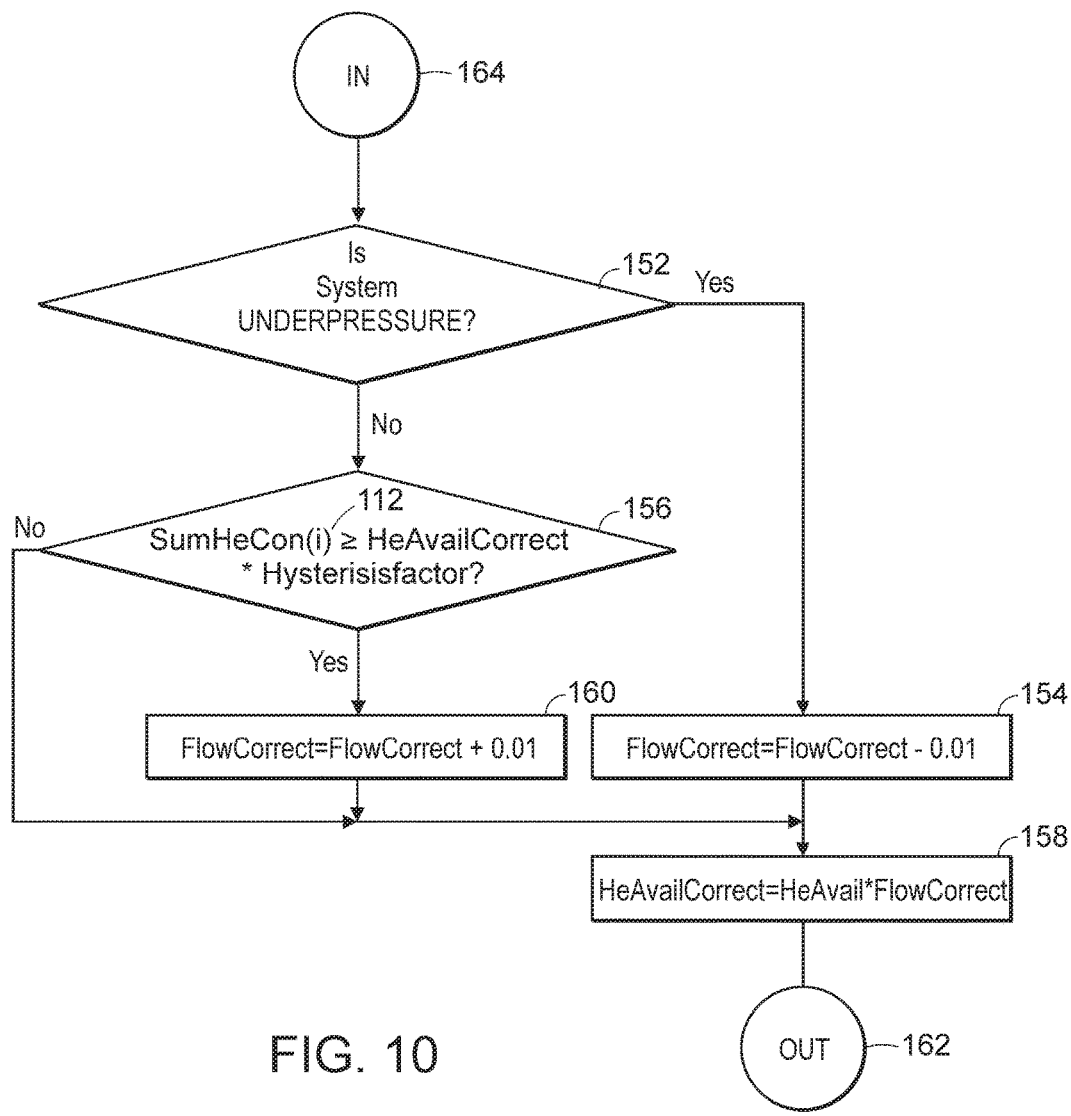
FIG. 10 shows a flowchart of the underpressure check routine.

FIG. 10 shows the underpressure check routine of step 140 in more detail. Referring to FIG. 10, the underpressure check routine 140 is entered, as shown at step 150. A check is performed to determine if the system is operating with an underpressure condition, as disclosed at step 152. The check may include reading a flag set during step 136 above, or it may recompute DP and compare it to the DP setpoint. If the system is still operating at underpressure, a flow correction factor is decremented by a predetermined value, such as 0.01, as disclosed at step 154. The flow correction factor is then multiplied by the current helium available corrected value 112 (FIG. 7) to yield a new helium available corrected value 112, as shown at step 158, and control reverts to the distribution per demand flowchart, as shown at step 162. In this manner, the computed helium available is reduced to allow the distribution routine, described further below, to compute the helium allocation from a smaller supply. Successive iterations, therefore, will have the effect of driving down the computed available helium until the system stabilizes or until a transition is made to overload 126 or DPH 128.

If an underpressure condition does not exist, then a check is performed to determine if the aggregate computed helium consumption for all pumps is greater than or within a certain threshold of the helium available corrected value 112, as shown at step 156. If the aggregate computed helium consumption is within a certain threshold, then the helium flow is sufficient and the flow correction factor is incremented by a predetermined value, such as 0.01, as disclosed at step 160, thereby increasing the computed helium available. The helium available corrected value is then recomputed, as shown at step 158, and control reverts to the DPD routine, as depicted at step 162.

Figure 11:
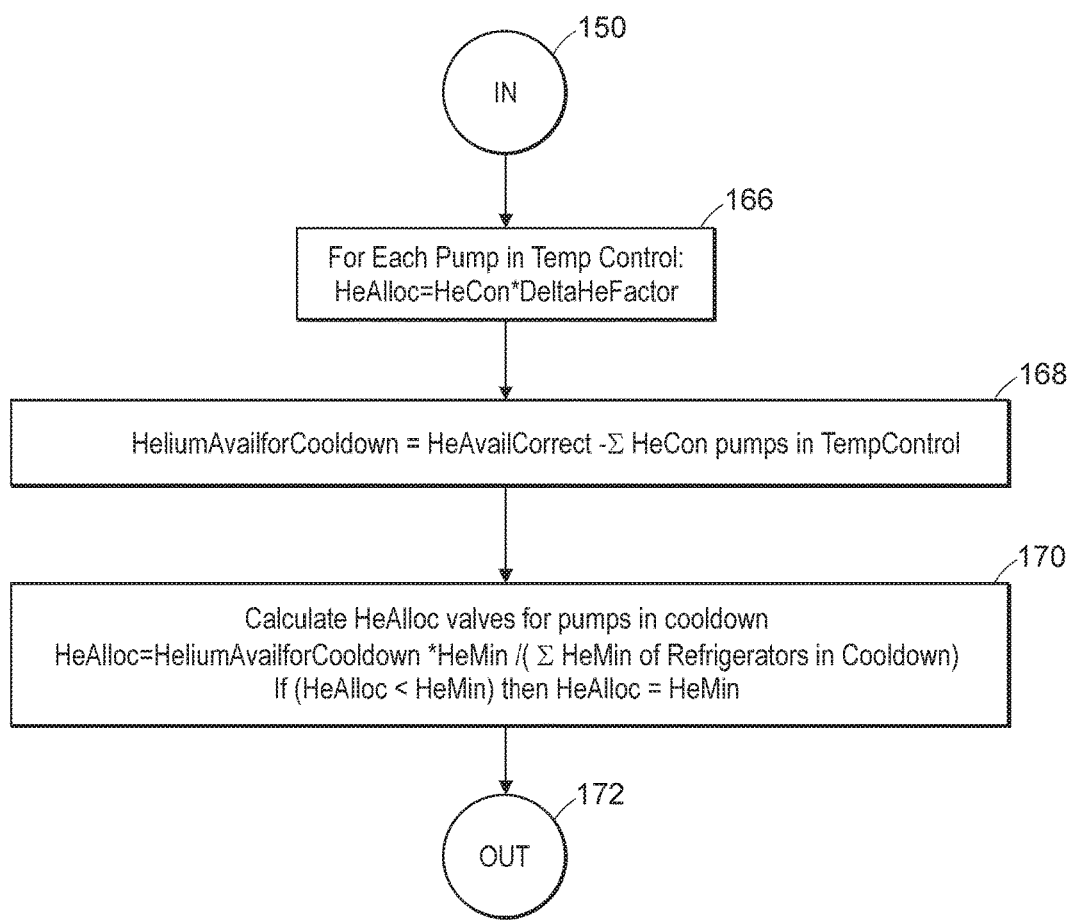
FIG. 11 shows a flowchart of the distribution routing.

FIG. 11 shows the distribution routine of step 142 (FIG. 9) in more detail. Referring to FIG. 11, the distribution routine is entered, as shown at step 164. The new allocated helium value for pumps in a temperature control mode is computed, as shown at step 166. The computed helium consumption value reported by each pump is multiplied by the delta helium factor of step 156 above to attempt to supply more helium to the pumps in temperature control. In a particular embodiment, the delta helium factor is 1.08. The helium available to apportion among the pumps in cooldown is then computed, as shown at step 168. The helium consumption value computed in step 166 is summed for all pumps in temperature control, and subtracted from the current value for helium available corrected to yield the helium available for cooldown. Therefore, all pumps in temperature control will be considered first, and the remainder apportioned among the pumps in cooldown. The helium available for cooldown is divided by the number of pumps in cooldown, as depicted at step 170, and is weighted to accommodate the relative size of the pumps if there are different sizes currently attached to the manifold. Further, if the computed helium allocation is less than the minimum helium allocation for a particular pump, then the minimum helium allocation will be used. Therefore, the system will attempt to redistribute additional helium to pumps in temperature control in order to alleviate the limit state in the one or more pumps reporting such a state. Control then reverts to the distribution routine, as shown at step 172.

Figure 12:
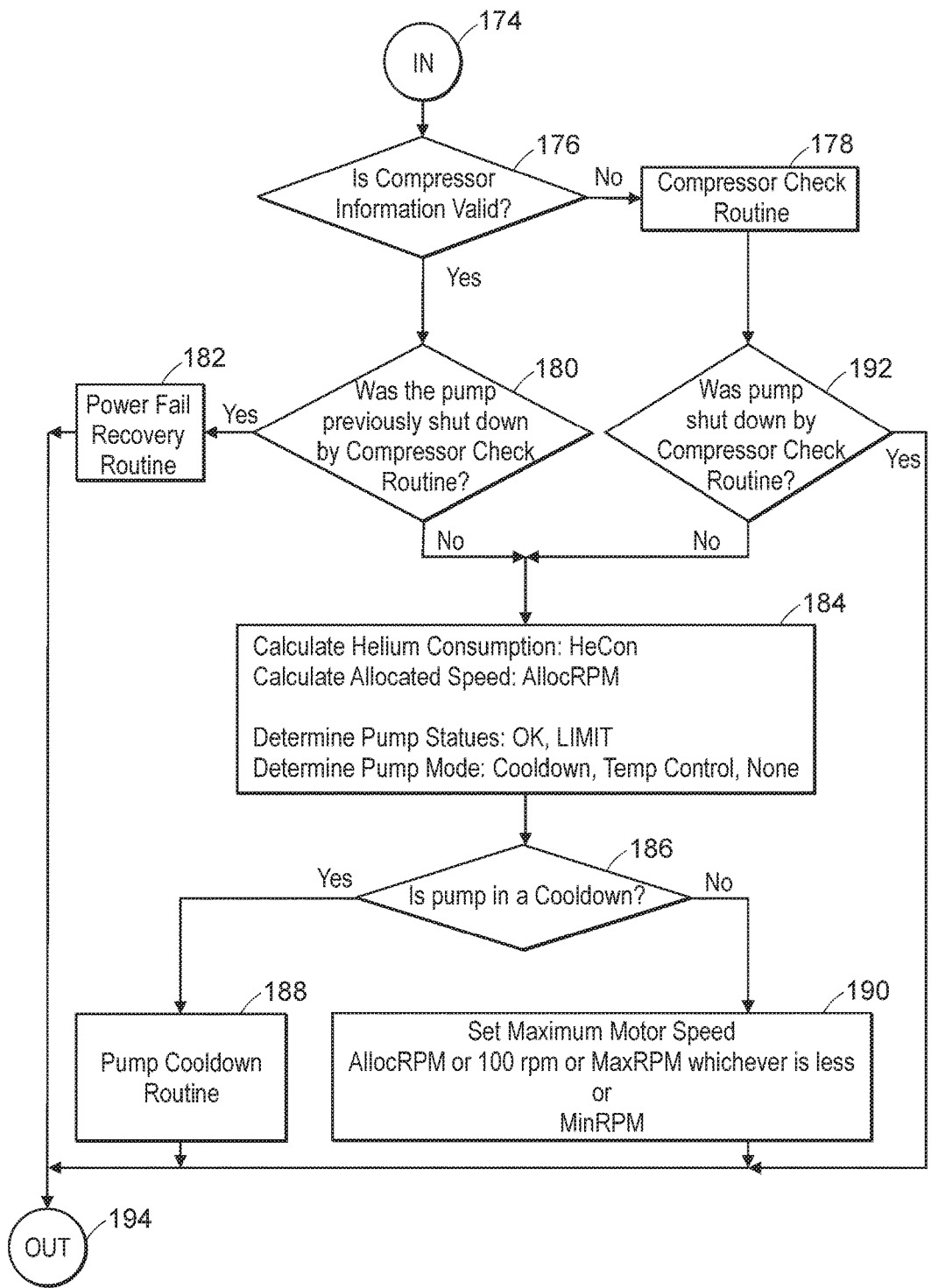
FIG. 12 shows a flowchart of the slave controller at the cryopump.

FIG. 12 shows a top level diagram of the pump control flow. As indicated above, the pumps operate in one of three modes: temperature control, cooldown, and none, and two states: ok and limit. The pump also computes the helium consumption value to report to the VNC. The pump slave controller periodically sends this information when requested by the VNC, and receives the allocated helium value from the VNC. The pump speed control loop flow then sets the maximum displacer speed (RPMs) accordingly. Note that the pump speed control loop operates in parallel to regulate displacer motor speed according to the first stage temperature within the RPM range as computed by the pump control flow. In a particular embodiment, the pump speed control loop is a closed loop proportional-integral-differential (PID) loop.

Referring to FIG. 12, the pump control flow loop in the pump slave controller is entered, as shown at step 174. Entry is initiated by the VNC 12 (master), but could also be from asynchronous means such as an interrupt driven mechanism. A check is performed to determine if the current values of compressor supply and return pressure, used to compute DP, are valid, as depicted at step 176. Causes of invalid compressor values include communications failure between the pumps, compressor, and VNC, transducer failure, or the compressor being turned off. If the compressor values indicate a possible problem, than the compressor check routine is entered, as disclosed at step 178 and described further below. If the compressor values appear valid, then a check is performed to determine if the pump was previously shut down by the compressor check routine, as depicted at step 180. If the pump was previously shut down by the compressor check routine, then a power failure recovery is performed, as depicted at step 182, to reinitialize, and the pump control loop is exited, as shown at step 194. If the pump was not previously shut down, than the current operating parameters are computed for the pump, as disclosed at step 184.

The operating parameters are computed as follows: the helium consumption parameter is computed to determine the current helium rate of consumption based on the first stage temperature, the second stage temperature, the current displacer speed (RPM), supply pressure, return pressure, and a pump constant based on the displacement of the pump (Cpumpconst):

Helium Consumption=$F(T1, T2, RPM, P_{supply}, P_{return}, C_{pumpconst})$

A new allocation RPM value corresponding to the helium consumption value is computed using the current allocated helium value sent from the VNC:

Allocation RPM=(Allocated Helium*RPM)/Helium Consumption

Note that the helium consumption value is also sent back to the VNC, as described above, to compute a new value for the allocated helium value. The pump status of ok or limit, and the pump operating mode of cooldown, temperature control, and none are also computed, and sent to the VNC.

After computing the pump operating parameters, a check is performed to determine if the pump is in a cooldown mode, as shown at step 186. If the pump is in a cooldown mode, the cooldown routine is entered, as shown at step 188 and described further below. If the pump is not in cooldown mode, then it is either on (in temperature control) or off, and the maximum RPM is set to the lesser of allocation RPM, MaxRPM for this pump, or a constant global Maxrpm, typically 100 rpm, but not lower than MinRPM, as described at step 190, and the pump control loop is exited, as shown at step 194.

Figure 13:
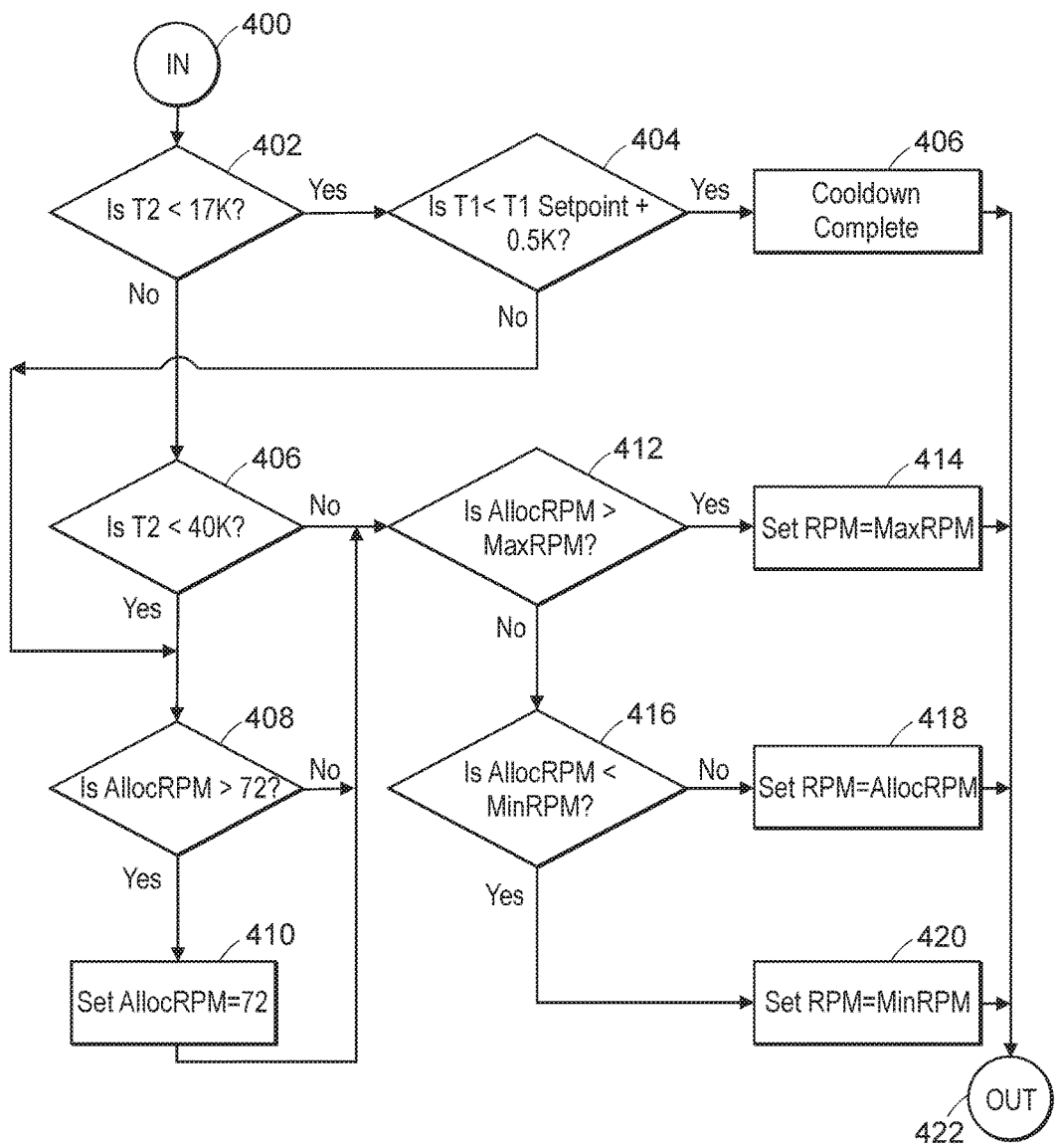
FIG. 13 shows a flowchart of the cooldown routine.

FIG. 13 shows the pump cooldown routine. Referring to FIGS. 12 and 13, if the pump is in a cooldown mode, control passes to the cooldown routine, as depicted at step 188. The cooldown routine is entered, as shown at step 400, and a check is performed to determine if the second stage temperature is less than 17K. If the temperature is less than 17K, than a check is performed to determine if the first stage temperature is within 0.5K of a T1 setpoint, typically 100K. The T1 (first stage) is set to the normal expected operating temperature. If the T1 temperature is sufficiently cold, than cooldown is complete, as disclosed at step 406, and the cooldown routine is exited, as shown at step 422.

If the second stage temperature is not less than 17K, than a check is performed to determine if the second stage temperature is less than 40K. If the second stage is less than 40, or if the first stage is not less than 0.5 K within the setpoint at step 404, then a check is performed to determine if the allocation RPM is greater than 72 rpm, as shown at step 408. If the allocation RPM is greater than 72, then it is set to 72 rpm, as shown at step 410. Therefore, the allocation RPM will be limited to 72 when the second stage is less than 40K or when the second stage is less than 17K but the first stage has not yet dropped to the T1 setpoint +0.5K.

A check is performed to determine if the computed allocation RPM is greater than MaxRPM, as shown at step 412. If it is, than current RPM is set to MaxRPM, as depicted at step 414, and the cooldown routine is exited, as shown at step 422. If allocation RPM is not greater than MaxRPM, than a check is performed to determine if it is less than MinRPM, as disclosed at step 416. If it is less than MinRPM, than RPM is set to MinRPM, as shown at step 420, otherwise it is set to allocation RPM, as described at step 418. The cooldown routine is then exited, as shown at step 422.

Figure 14:
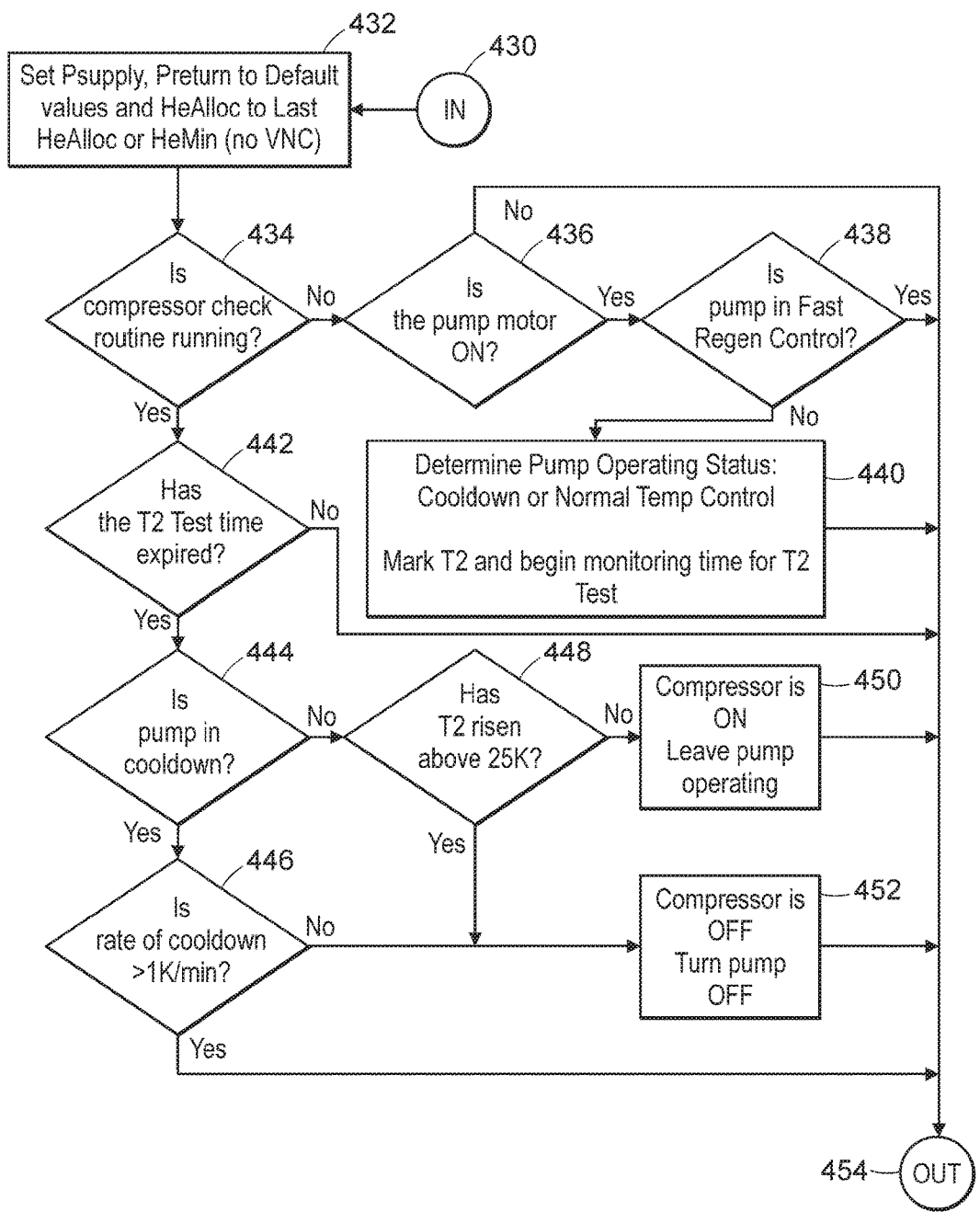
FIG. 14 shows a flowchart of the compressor check routine.

Returning to FIG. 12, step 178 shows the compressor check routine. FIG. 14 shows the compressor check routine in more detail. Referring to FIGS. 12 and 14, the compressor check routine is entered, as shown at step 430. The main purpose of the compressor check routine is to determine if the compressors are functioning, and to shut the pumps down if they are not operational. Default values for supply pressure, return pressure, and helium allocation are specified, as shown at step 432. Typically these values are defaults of supply pressure=400 psi, return pressure=200 psi, and helium allocation=minimum helium, if the pump is in cooldown and the previous value for helium allocation if it is in temperature control.

A check is performed to determine if the compressor check routine was entered during a previous iteration through the pump control flow loop, as disclosed at step 434. A compression check triggers a test timer which runs asynchronously from the pump control routine. Accordingly, multiple iterations through the compressor check routine will typically occur as the pump is monitored over the test interval. If the compressor check routine was not previously running, a check is performed to determine if the pump motor is on, as shown at step 436. If it is not, the compressor check routine is exited, as disclosed at step 454. If the pump motor is on, then a check is performed to determine if the pump is in a regeneration mode, as shown at step 438. If it is, then the compressor check routine is exited, as disclosed at step 454.

If the pump is not in regeneration mode, then the current operating mode, cooldown or on (in temperature control) is recorded, and a test timer is set, as shown at step 440. The following iteration through the compressor check routine will indicate that the compressor check routine is running, as depicted at step 434, and a check is performed to determine if the test timer has expired, as shown at step 442. The test timer is to allow a predetermined interval of time over which to monitor the system for normal operation. If the test timer has not yet expired, then the compressor check routine is exited, as disclosed at step 454, to wait for the next iteration. If the test timer has expired, then a check for cooldown mode is performed, as disclosed at step 444. If the pump is not in cooldown, than a check is performed to determine if the second stage temperature has risen above a predetermined threshold, as shown at step 448. In a particular embodiment, the threshold is 25K. If the pump has not warmed past the predetermined threshold, then the compressor is determined to be on and the pump is left operating, as depicted at step 450. If the pump is not in cooldown, then a check is performed to determine if the rate of cooldown is greater than a predetermined rate, such as 1K per minute, over the test timer interval, as described at step 446. If the rate of cooldown is not greater than 1K/min, or if the second stage temperature has risen above 25K, then the compressor is determined to be off and the pump is shut down, as shown at step 452. Control then passes to step 454 and the compressor check routine is exited until the next iteration.

Returning to FIG. 8, the distribution per hierarchy (DPH) state 128 can also be used to deal with situations beyond normal operating conditions. This can be brought on by excessive heat load in the vacuum system or by the degradation of a pump or compressor. The primary purpose of distribution per hierarchy is to allocate helium to the most important pumps on the system while denying it to those of lesser importance. In some cases, a pump should be shut down completely to allow helium to be used elsewhere. The system user must enable the distribution per hierarchy (DPH) function and define the relative importance of each pump. For example, in a particular embodiment, a sputtering system consists of two load-lock chambers, a buffer chamber, a transfer chamber, and four or more process chambers connected to the transfer chamber. A process chamber pump might receive priority level 3, the transfer chamber pump level 2, and the buffer chamber pump level 1. A process chamber that has no wafer in it might be assigned priority level 4. In case of a fault on the system that caused helium consumption to exceed demand, the tool controller would determine if any of the process chambers did not have a wafer in it, thus assigning them to level 3 or 4. A process chamber without a wafer would have its allocated helium reduced or the pump could be turned off to permit the other chambers to keep operating. Part of the hierarchical system is to allow the system to have a "soft crash." That is, in a degrading system, wafers would have time to finish processing and move out of process chambers, through the transfer chamber to the buffer chamber and back to the load locks as the pumps were turned off behind them. The transfer time for such a process might be on the order of one to three minutes. The DPH state 128 would first turn off the level 4 pumps one at a time, then level 3, and so on. If the fault condition goes away, the pumps could be turned on again.

An assumption before entering the DPH state 128 is that there is no longer any excess helium flow available on the system and therefore the system is beyond the distribution per demand state 124. Some pumps may be operating acceptably with their allocation of helium, but at least one pump has demanded more helium and none is available. Continued operation will result in the warmup of one or more pumps. Use of the predetermined hierarchy imposed by the DPH state 128 will allow the VNC to perform "triage" to let the most important pumps keep cold while sacrificing the other pumps. While three to five levels of priority may be typical for a particular embodiment, the DPH state 128 should allow the user to define the number of priority levels, including one level for each pump on the manifold.

The tool host controller may dynamically allocate the priorities based on such issues as the presence or absence of a wafer. The user may also desire to maintain vacuum in a particular chamber until some condition is fulfilled, like cooling down a very hot fixture. Users may pre-program whether a pump should be allowed to shut down entirely or allocated some minimum amount of helium. Where pumps have been given the same priority level, then the VNC will arbitrarily select one pump at that level to shut down or re-allocate helium. Action on other pumps at the same or higher levels may be required until system stability is achieved.

The VNC may also enter a DPH state during pump cooldown. On some tools, it may be desirable to ensure that one or more pumps gets to operating temperature first. Priority can be given these pumps by using logic to give higher allocations to these pumps during cooldown relative to other pumps on the map.

The VNC will accept hierarchy assignments from the tool host computer and store them. In the event of a problem while DPH is enabled, the VNC will use the currently-assigned priorities to control the pumps. Alteration of priority levels by the tool host should be accepted by the VNC while DPH is in operation to deal with rapidly changing situations.

Figure 15:
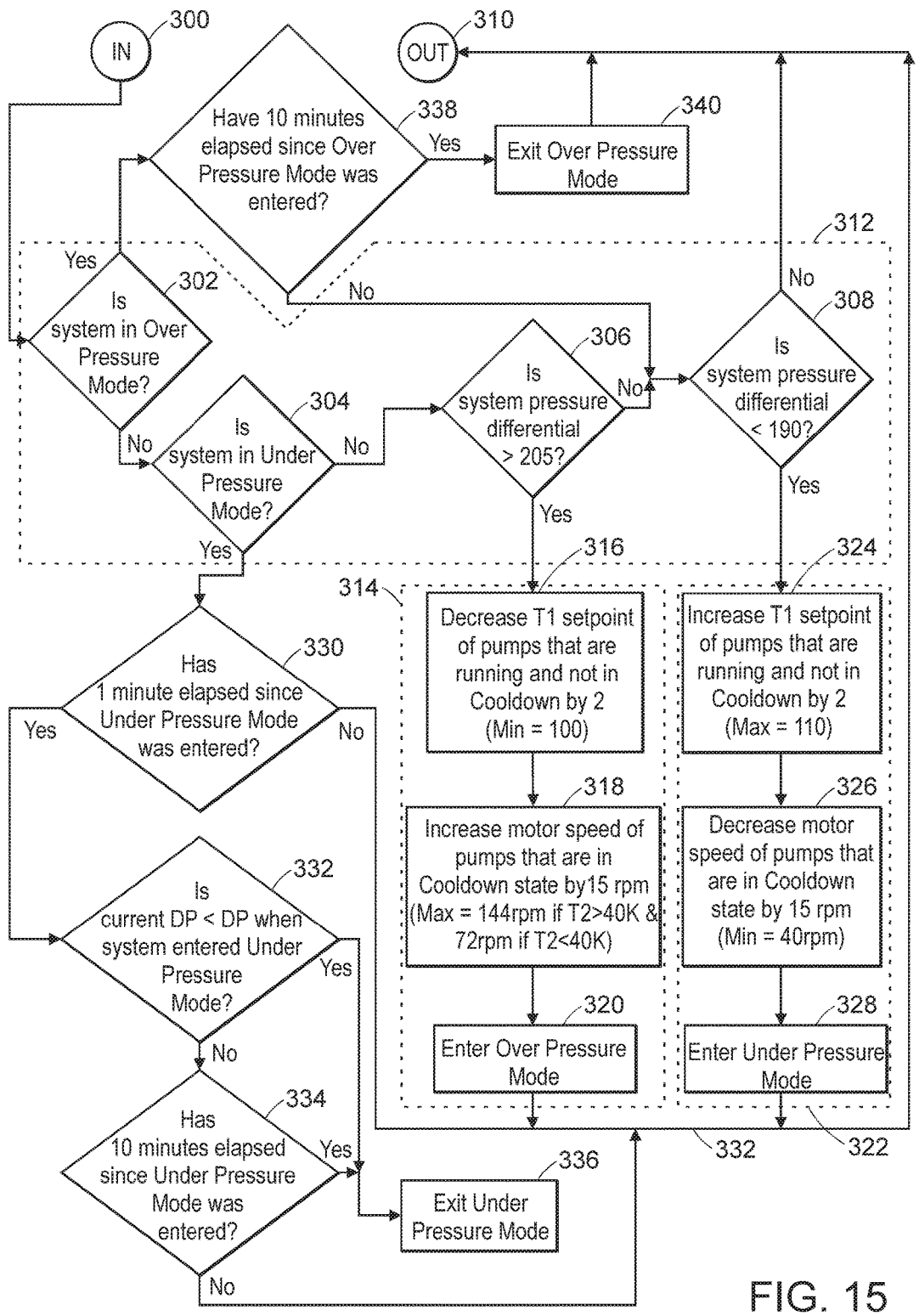
FIG. 15 shows a flowchart of helium management control in another particular embodiment employing three states of control.

In another particular embodiment, the helium management control system employs three modes of control, depicted in FIG. 15. This system uses a pressure differential DP to determine the mode of control. Referring to FIGS. 1b and 15, the pressure differential is the difference in pressure between the high pressure supply 46 line and the low pressure exhaust 48 line. In a typical cryopump, the high pressure supply 46 line is at about 400 psi, and the low pressure exhaust 48 line is at about 200 psi. The pressure differential is the difference between these two lines, and is typically about 200 psi. In extreme situations, if many cryopumps are consuming helium at a high rate, the pressure differential can drop below a critical threshold whereby the refrigeration capacity begins to degrade sharply. It is one object of the present system to prevent the pressure differential from falling to the critical threshold.

In the system depicted in FIG. 15, the control modes are determined as follows: a normal mode occurs when the pressure differential is at from 190 to 205 psi; an under pressure mode occurs when the pressure differential is below 190 psi; an over pressure mode occurs when the pressure differential is above 205 psi. It should be noted that these ranges are approximate, and could be tuned in an actual system to provide alternate ranges of the pressure differential corresponding to the control modes.

Continuing to refer to FIG. 15, a flowchart shows the operation of the helium management control system using three modes of control: normal, over pressure, and under pressure. When the pressure differential falls outside between 190 psi and 205 psi, or normal mode, the speeds of the displacer drive motors will be controlled to attempt to bring the system back into a normal mode. Each of the cryopumps has a temperature setpoint. The setpoint of the cryopump is the temperature that the displacer drive motor will attempt to achieve during normal cryopumping temperatures. Reducing the setpoint will tend to have the effect of increasing the speed of the displacer drive motor to consume more helium and reduce the temperature of the cryopump. Similarly, increasing the setpoint will allow the cryogenic refrigerator to warm, tending to reduce the speed of the displacer drive motor and therefore consume less helium. The setpoint is used internally by the cryopump to vary the speed of the displacer drive motor to match the temperature of the first stage of the cold finger to the setpoint, using closed loop control or other electronic control mechanism in the cryopump. Further, the setpoint and the displacer drive motor speed both have an operating range beyond which the motor speed and setpoint may not be further modified.

More specifically, a polling interval expires, as depicted at step 300, and the system begins another check cycle. A check is made to determine if the system is currently in over pressure mode, as shown at step 302. If the system was not in over pressure mode, then a check is made to determine if the system is in under pressure mode, as disclosed at step 304. If the system was not in under pressure mode, then a check is made to determine if the pressure differential is greater than 205 psi, as depicted at step 306. If the pressure differential is not greater than 205 psi, then a check is made to determine of the pressure differential is less than 190 psi, as shown at step 308. If the pressure differential was not less than 190, then control reverts back to step 310 until the next polling interval expires. The dotted line 312 outlines the sequence of steps depicting normal mode operation, as just described. This iteration is repeated until the pressure differential falls outside between 190 and 205 psi, described further below.

The system of FIG. 15 serves to lower temperature setpoints and increase motor speed at 314, below, if the pressure differential is greater than 205 psi. The temperature setpoints are increased and the motor speed is decreased at 322, below, if the pressure differential drops below 190 psi. After a change, the system is placed in an over pressure or an under pressure mode for a time during which further changes are not permitted in order to allow the system to stabilize.

At step 306, if the pressure differential is greater than 205, then a potential over pressure condition is occurring. An over pressure condition is indicative of excess helium in the system. Dotted line 314 generally depicts the over pressure corrective actions. In order to utilize the excess helium, the setpoint of all cryopumps not in cooldown, and which are running, is decreased 2K, as disclosed at step 316. The drive motor speed of any cryopumps in cooldown is increased by 15 rpm, as shown at step 318. The system mode is set to over pressure mode to indicate that there is excess helium refrigerant capacity which can be utilized, as depicted at step 320. Note that there are minimum and maximum drive speed thresholds, described further below, which will keep the drive motor speed within the predetermined operating range.

Continuing from above, at step 308, if the pressure differential is less than 190, than a potential under pressure condition is occurring. An underpressure condition is indicative of a sparsity of helium in the system. Dotted line 322 generally depicts the steps taken to correct an under pressure condition. In order to conserve helium, the setpoint of all cryopumps not in cooldown is increased 2K, as shown at step 324. The drive motor speed of the cryopumps in cooldown is decreased by 15 rpm, as disclosed at step 326. Decreasing the speed of the cryopumps in a cooldown state will tend to lengthen the cooldown time, but will free up excess helium to correct the under pressure condition and allow the pumps operating at normal cryopumping temperatures to continue operation. The system mode is then set to under pressure, as depicted at step 328, to indicate that an under pressure condition exists.

Continuing from above at step 304, if an under pressure condition already exists, a check is performed to determine if the under pressure mode has persisted for greater than one minute, as disclosed at step 330. If the current under pressure mode has not persisted for more than 1 minute, control reverts to step 310 to wait for the next polling interval to avoid system thrashing. If the current under pressure mode has persisted for more than one minute, then a check is performed to determine if the current pressure differential DP is less than the pressure differential which caused under pressure mode to be entered, as depicted at step 332. If under pressure mode has been previously entered, than the system should be starting to raise the pressure differential, otherwise there is a need for more aggressive helium management. If the pressure differential DP is not less than the reading which caused under pressure mode to be entered, than a check is performed to determine if the current under pressure mode has persisted for ten minutes, as disclosed at step 334. If not, control reverts to step 310 to wait for the next polling interval. The system therefore allows ten minutes for the system to return to a normal pressure differential range before pursuing more aggressive helium management.

If the pressure differential is continuing to fall, or if ten minutes have elapsed since under pressure mode was entered, the system exits under pressure mode, as disclosed at step 336. Under pressure mode is exited so that further corrective operations may occur at the next polling interval, described further below. Control reverts to step 310, and at the next polling interval, shown at step 300, the check at step 304 will indicate that the system is not in under pressure mode. Accordingly, the pressure differential check at step 308 will indicate that the pressure differential is still below 190, and the under pressure actions 324, 326, and 328 will recur, as described above.

Continuing from above at step 302, if an over pressure condition already exists, then a check is performed to determine if the current over pressure mode has persisted for more than ten minutes, as shown at step 338. If not, control reverts to step 308 for the low pressure differential check. If the current over pressure mode has persisted for more than ten minutes, then the system exits over pressure mode, as depicted at step 340, and control reverts to step 300 to wait for the next polling interval. The system falls out of over pressure mode to trigger the over pressure correction check. At the next polling interval, shown at step 300, since over pressure mode is no longer set, the over pressure mode check at step 302 will advance control to step 306. If the pressure differential is still greater than 205, the over pressure actions of steps 316, 318, and 320 will recur, as described above.

In another particular embodiment, there are four control states of helium management at the controller, described further below, and three modes. Briefly, the modes are setup, normal, and cooldown. Setup occurs during initial system setup to determine which compressors and cryopumps are connected to the system. Cooldown mode indicates that one or more cryopumps is performing a cooldown operation. Normal mode occurs when the system has been started and all cryopumps have completed initial cooldown.

Each of the cryopumps attached to the system also has three helium management operating modes which are reported to the controller. A temperature control (TC) mode indicates that the cryopump is being controlled by the controller. A cooldown (CD) mode indicates that the cryopump is performing a cooldown operation. A none (NONE) mode indicates that the pump is being allowed to freely consume helium as the drive motor is permitted to run at a maximum speed.

The four control states of the helium management control system are each generally indicative of a need for more aggressive helium management. The operating states are similar to the control modes described in the previous embodiment. A normal state allows unregulated helium consumption by all cryopumps 10 in the system. A limit check state occurs when a pump is consuming equal to the maximum consumption computed by the controller. A distribution per demand state occurs when a pump which reported a minimal supply continues to be starved after a predetermined threshold time. Distribution per demand causes excess helium in the system to be redistributed, or for the maximum helium supply parameter for each cryopump to be reduced if there is no excess. If all pumps report helium starvation, a distribution per hierarchy state allocates helium to critical cryopumps per a predetermined hierarchy by reducing helium to less critical pumps, which are allowed to warm.

The cryopumps also have a helium consumption status. An OK status indicates that the cryopump is consuming less than 95% of the maximum helium supply parameter. An APPROACHING status indicates that the cryopump is consuming greater than 95% of the maximum helium supply parameter. A LIMIT status indicates that the cryopump is consuming helium equal to the maximum helium consumption parameter. The helium consumption status is used to determine if a cryopump is consuming the maximum amount of helium needed to maintain cryopumping temperatures, and is therefore on the threshold of warming up. The approaching status is not used to determine helium management control, but may be queried by an operator as an informational item.

Figure 16A:
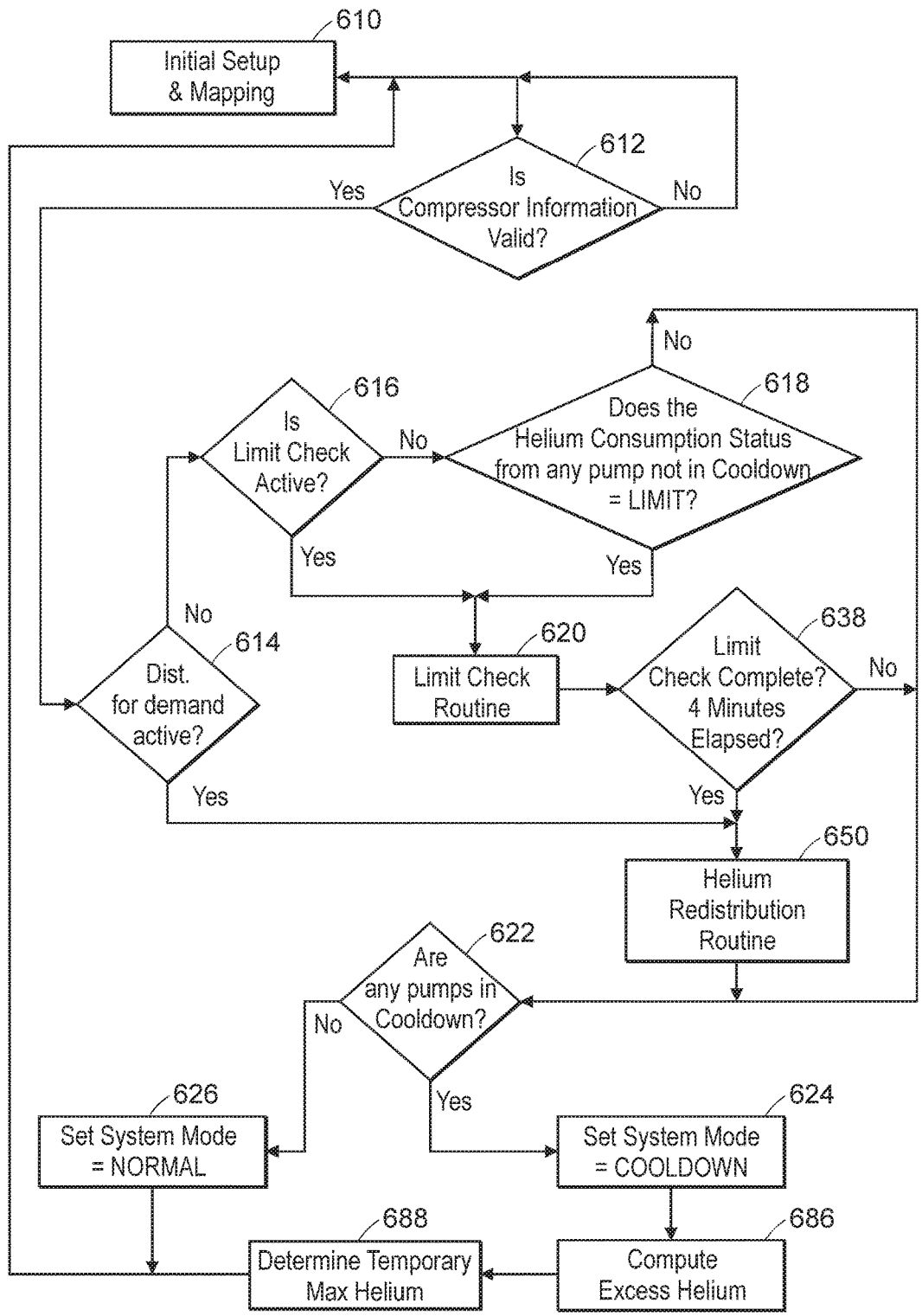
FIGS. 16a-16c show a flowchart of helium management control in a particular embodiment employing four states, or modes, of control.
Figure 16B:
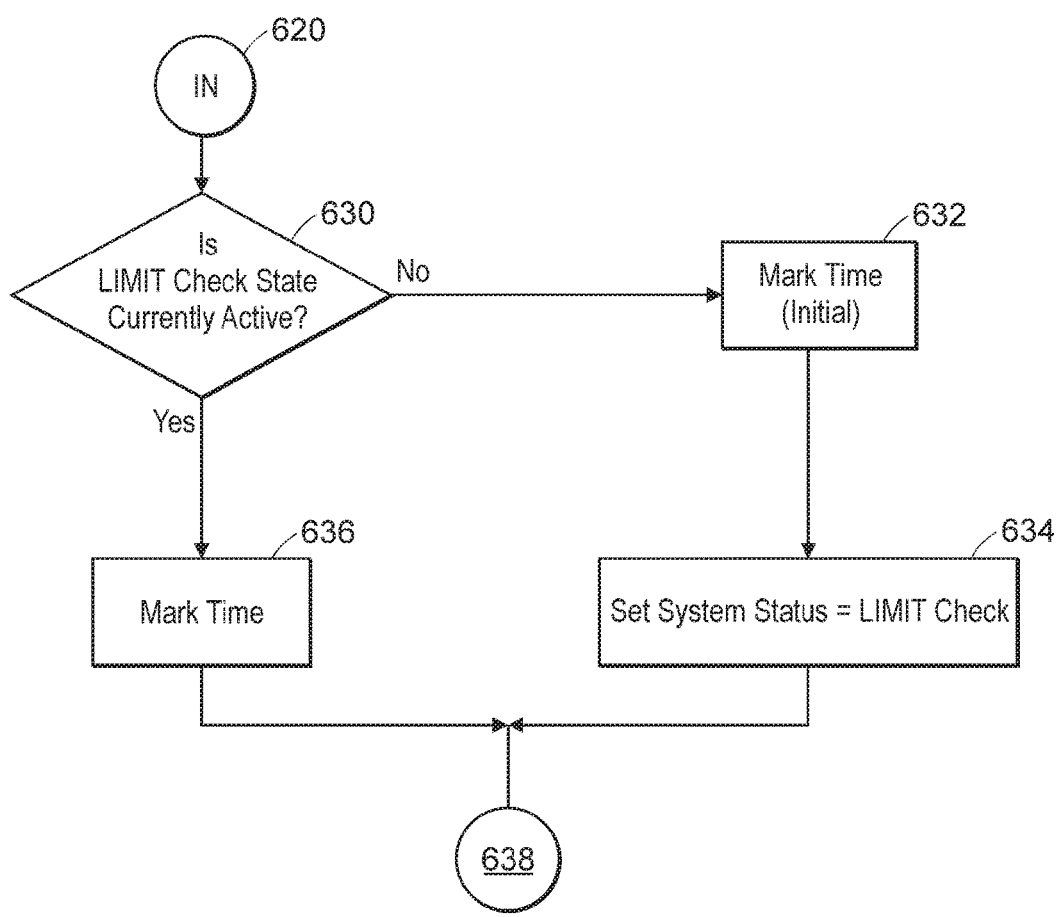
Figure 16C:
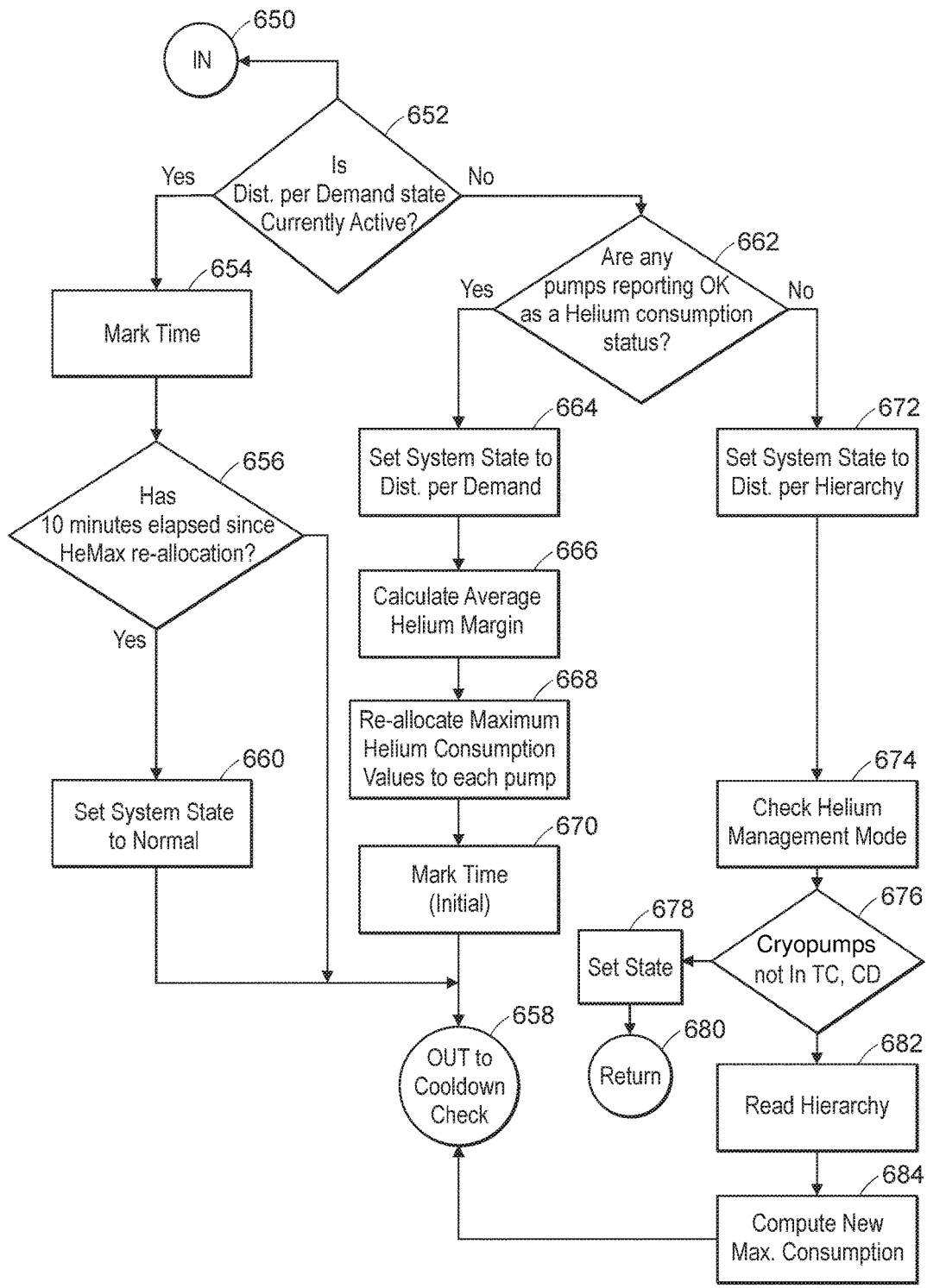

FIGS. 16a-16c show a flowchart of helium management control in the controller 12 as depicted in FIG. 2 in greater detail. Referring to FIG. 16a, an initial setup and mapping occurs, as depicted at step 610. The initial setup and mapping determines all the compressors 16 and cryopumps 10 connected to a common manifold 18. As indicated above in step 610, each cryopump sends a cryogenic refrigerator size, a minimum helium supply, a helium consumption rate, and a cooldown completion time, to be stored in the controller. The controller also receives the helium supply available from each compressor 16. If there is insufficient helium available to support at least the minimum helium supply for each pump, operation terminates. An initial helium distribution is computed, based on a proportional distribution according to cryopump size, and a maximum helium consumption signal is sent to each cryopump. The controller may also read initial setup parameters indicative of a distribution hierarchy, described further below, and other operating parameters and defaults.

The controller then begins a control loop, receiving periodic input from each cryopump. Parameter signals, indicative of operating parameter data, is received from each of the sensors 14, and a check is performed on the data received to determine if it is valid, as shown at step 612. Control reverts to step 612 until valid readings are obtained. A check is performed to see if the distribution per demand state is active, as disclosed at step 614. The distribution per demand state may be active if a previous distribution per demand state was triggered, described further below with respect to FIG. 16c.

If the distribution per demand state is not active, then a check is performed to determine if the limit check state is active, as shown at step 616. The limit check state may be active if a previous limit check was positive. If the limit check state is active, control reverts to step 620, described further below with respect to FIG. 16b. If the limit check state is not active, than the current consumption status for each cryopump is examined, as depicted at step 618. For any pump which is not in a cooldown state, the current consumption rate is examined against the maximum helium consumption for that cryopump to determine if a limit has been reached. Alternatively, the limit may be a percentage of the maximum helium consumption, such as 95%, in order to run the system in a more conservative manner. If the limit has been reached by one or more of the cryopumps, control reverts to step 620, described further below with respect to FIG. 16b.

If the limit has not been reached, then a check is performed to determine if any of the cryopumps are in the cooldown state, as depicted at step 622. If none of the cryopumps are in the cooldown state, the system status is set to normal, as shown at step 626, and control reverts to step 612 for the next control loop iteration.

If any of the cryopumps are in the cooldown state, the system mode is set to cooldown, as shown at step 624. A cooldown operation occurs after a regeneration, or during initial system startup, and brings the cryogenic refrigerator back down to normal operating temperatures after being warmed. A cooldown state consumes more helium than a normal state. Accordingly, the system is then examined for excess helium as in the helium redistribution state. The helium margin for all pumps not in a cooldown mode is computed and summed to determine an excess helium value, as disclosed at step 686. A temporary maximum helium consumption value is then computed for the cryopumps in cooldown, as disclosed at step 688. If multiple cryopumps are in cooldown, the temporary maximum helium consumption value is distributed proportionally according to the size of the cryogenic refrigerator of each cryopump, as per the formula described further below with respect to FIG. 17b. Control then reverts to step 612 for the next control loop iteration.

Continuing from above, at step 620 the limit check state is entered. Referring to FIG. 16b, a check is performed to determine if the limit check state is currently active, as shown at step 630. If it was not previously active, the time is marked as the initial time of the current limit check, as shown at step 632, and the system status is set to limit check, as depicted at step 634. If the limit check state is already running, indicating that the system was already in a limit check state, then a timestamp is recorded as an ongoing limit check state, as disclosed at step 636. Returning to FIG. 16a, a check is performed to determine if the current limit check state has persisted for more than a predetermined limit check threshold. In a particular embodiment, a check is performed to determine if the current limit check threshold has persisted for more than four minutes, as shown at step 638. If the system has not been in a limit check state for more than four minutes, then the limit check state is exited, as shown at step 638, and control is passed to the cooldown check, as depicted at step 622. If the system has been in a limit check state for more than four minutes, then control is passed to the helium redistribution routine, described further below, as disclosed at step 650. In this manner, the system is allowed a four minute threshold for a limit check condition to correct before pursuing more aggressive helium management.

Continuing from above, in FIG. 16a steps 614 and 638, if a helium redistribution is indicated, as shown at step 650, control is transferred to the helium redistribution routine, shown on FIG. 16c. Referring to FIGS. 16a and 16c, a check is made to determine why the helium redistribution state has been entered, as shown at step 652. If the helium redistribution state was not already active, then a new helium redistribution computation needs to occur because a previous limit check state did not correct itself within four minutes. A check is performed to determine if any pumps are reporting a helium consumption state of OK, as depicted at step 662. If at least one pump is reporting OK, and not LIMIT, helium redistribution is performed using the less aggressive distribution per demand computation. In this context, one of the cryopumps is consuming helium equal to the maximum consumption value and will warm up unless action is taken. The system state is set to distribution per demand, as depicted at step 664, and the controller examines the set of operating parameters for each cryopump. The operating parameters include current helium consumption, the maximum helium consumption, the helium consumption status (OK, APPROACHING, or LIMIT), and cryopump operating mode TC (temperature control), CD (cooldown), or NONE), and cooldown completion time if operating mode was CD.

An average helium margin is computed from the operating parameters for each pump, indicative of the difference between the current consumption of helium and the maximum consumption allowed for each pump, as depicted at step 666. The average helium margin, indicative of excess helium in the system, is used to compute a new maximum consumption value for each pump, as indicated at step 668, according to the following formula:

For each cryopump:

Helium Margin=Max Consumption−Current Consumption

Calculate average margin:

Average Margin=sum (Helium Margin)/# of Cryopumps

For each cryopump:

HeMax=Current Consumption+Average Margin

Calculate new system total helium max consumption:

Total System Max=sum (He Max)

For each cryopump:

New Max Consumption=Max Consumption+(Total System He Available−Total System Max)# of Cryopumps Therefore, excess helium is distributed by setting a new maximum consumption for each cryopump based on total helium available from the common manifold and the aggregate current maximum consumption for all the cryopumps. A time stamp indicative of the time of reallocation is written, as shown at step 670. Control then reverts to the cooldown check in FIG. 16a at step 622, as shown at step 658.

If the distribution per demand state was already active, then a timestamp is recorded as an on ongoing helium redistribution operation, as depicted at step 654. A check is performed to determine if more than a predetermined redistribution threshold has elapsed since the current distribution per demand state was entered. In the particular embodiment shown, the predetermined redistribution threshold is ten minutes. If the current distribution per demand state has not been in effect for at least ten minutes, control reverts back to the main control loop at the cooldown check 622 (FIG. 16a), as shown at step 658. If the helium redistribution mode has been in effect for at least ten minutes, then the redistribution is presumed to have effectively redistributed the helium, and system state is set to normal, as depicted at step 660, so that the main loop in FIG. 16a can continue to monitor at regular intervals. In this manner, each iteration through the helium redistribution routine provides ten minutes for the redistribution to take effect on the system. If the redistribution was not aggressive enough, the helium redistribution state will again be entered and recalculated to provide more aggressive helium management, until the system reaches a state of equilibrium.

If no pumps were reporting a helium consumption status of OK at step 662, then all pumps had reached their maximum consumption limit, and helium redistribution is performed using the more aggressive distribution per hierarchy computations. In this context, no pumps are reporting a status of OK, and therefore all pumps are at a LIMIT status, indicative of no excess helium in the system. The operating parameters, enumerated above, are read from each cryopump and used to determine new maximum helium consumption and possibly shut down one or more cryopumps.

The system state is set to distribution per hierarchy, as depicted at step 672. The current operating mode of each pump is examined, as shown at step 674. A check is made to determine if any pumps were found which were not in temperature control or cooldown, as disclosed at step 676. If any pumps were found not in TC (temperature control) or CD (cooldown), they are placed in one of these states, as depicted at step 678, and control reverts to step 612, FIG. 16a to wait for the next control interval, as shown at step 680.

If all pumps are in either temperature control or cooldown, cryopumps must be selected to warm up or decrease their rate of cooldown. A cryopump hierarchy is read, as shown at step 682, to determine which cryopumps are most critical and therefore will receive a sustained supply of helium. The cryopump hierarchy is a site-specific organization of the priority of cryopumps which should be maintained at cryopumping temperatures. The hierarchy may be modified dynamically based on the activities occurring in the vacuum process chambers connected to each of the cryopumps. Cryopumps concerned with critical processes, such as an expensive semiconductor payload, for example, would typically continue to be supplied with helium. The cryopumps that are less critical as specified in the hierarchy will be allowed to warm up or will decrease their rate of cooldown. Based on the hierarchy, a new maximum helium consumption value is computed for each cryopump, as shown at step 684. Control then reverts to step 622 for the cooldown check, as shown at step 658.

Figure 17A:
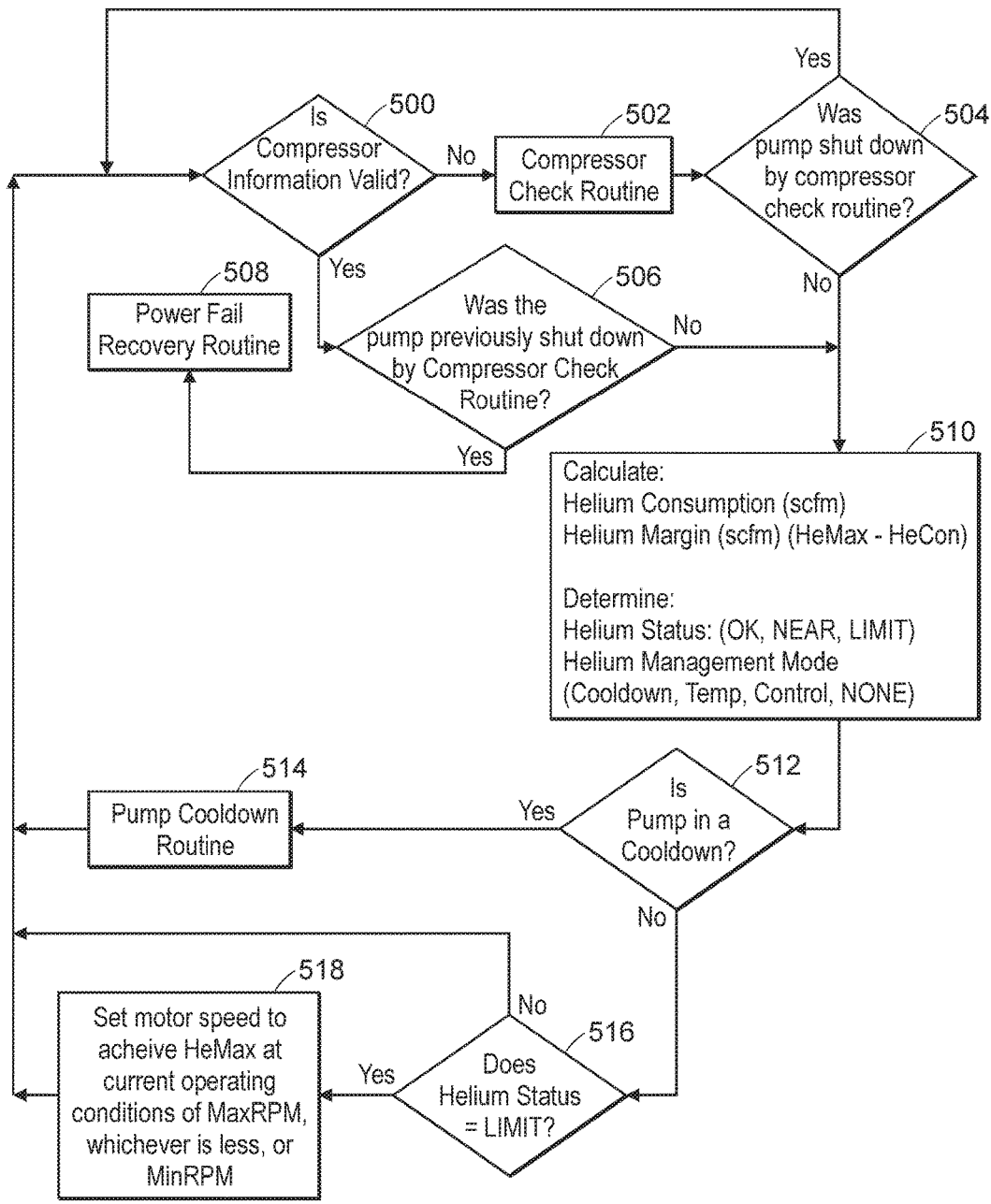
FIGS. 17a-17b show a flowchart of helium management control in a cryopump connected to the controller in FIGS. 16a-16c.
Figure 17B:
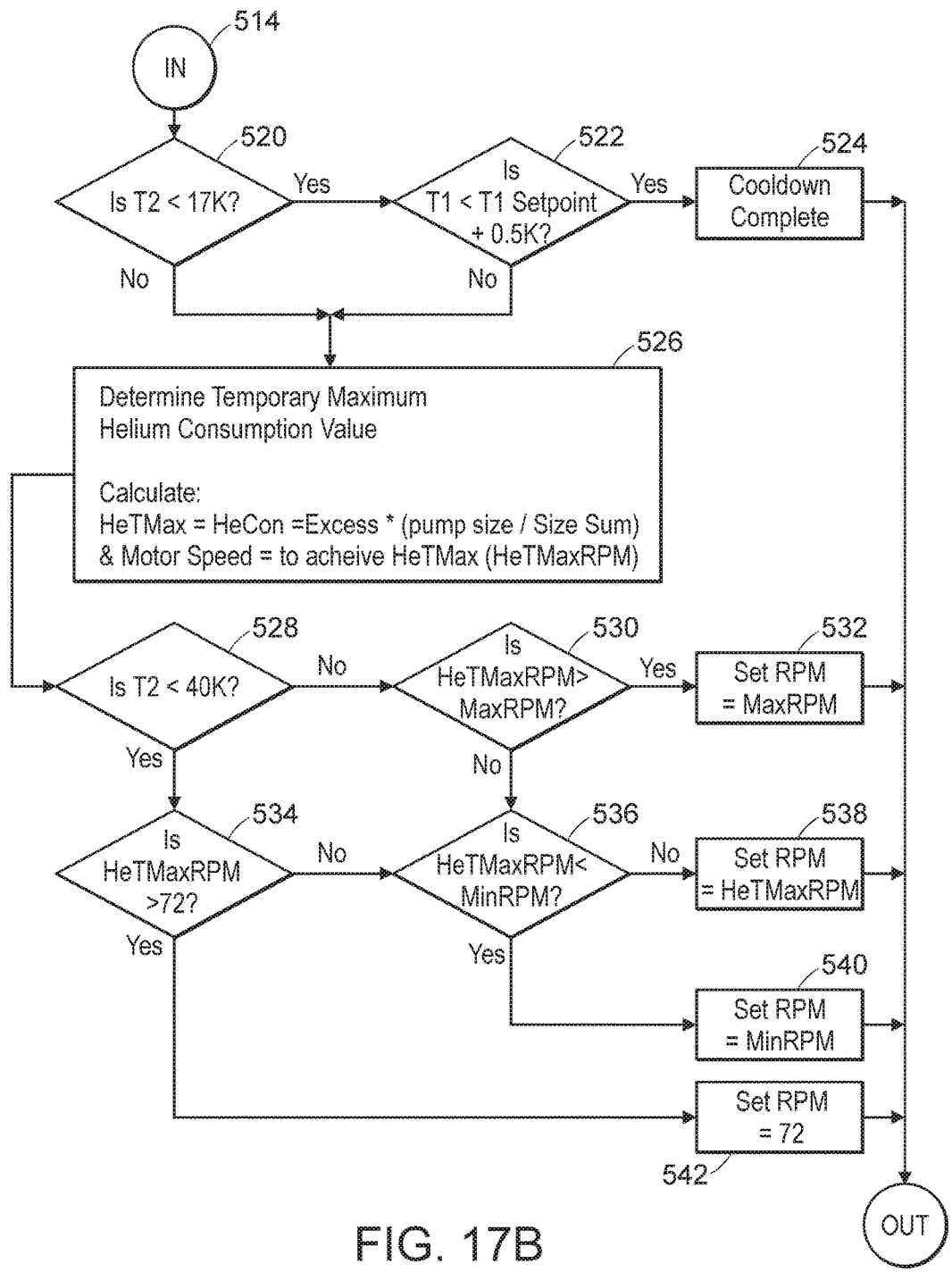

FIGS. 17a-17b show a flowchart of the cryopump operations. Referring to FIG. 17a, the cryopump control loop begins at step 500. The information sent from the compressor is checked to assure validity, as shown at step 500. The information sent from the compressor is compared to a range of normal values. If the information sent is outside the range of normal values, the compressor check state is entered, as shown at step 502, to perform compressor diagnostics. Since a compressor is cooled by the helium it supplies, extreme readings can be indicative of a potentially damaging condition, such as a lack of helium. The compressor check routine will determine if the cryopumps need to be shut down. If the cryopump has been previously shut down by the compressor check routine, control reverts to step 500 until the system indicates that the cryopump may resume operation, as depicted at step 504. If the information sent from the compressor was valid, the cryopump verifies that it was not instructed to shut down by the compressor check routine, as shown at step 506. The compressor check routine is used to prevent damaging operation to the compressor from running without helium, but also to avoid shutting down a pump due to a more benign problem, such as a defective sensor. If the pump was previously shut down by the compressor check routine, a power fail recovery routine will be invoked to restart the pump, as shown in step 508.

The cryopump calculates a helium margin by determining the difference between the current rate of consumption and the maximum helium consumption sent from the controller. The cryopump then determines the helium consumption status based on the margin, and also determines the current cryopump operating mode, as disclosed at step 510. The cryopump then checks to see if it has been placed into a cooldown state, as shown at step 512. If the cryopump is not in a cooldown state, a check is performed to see if the pump operating status is LIMIT, as shown at step 516. A LIMIT operating status occurs when the pump is consuming helium equal to the maximum helium consumption parameter sent from the controller. If the pump operating status is LIMIT, a new maximum helium consumption parameter will be computed and sent from the controller, as described above. The cryopump will compute and set the drive motor speed to correspond to the maximum helium consumption parameter, as depicted at step 518. Alternatively, each cryopump has a minimum and maximum operating range, which will take precedence if the computed drive motor speed falls outside the range.

If the pump was placed into a cooldown mode, as shown at step 512, the pump cooldown routine is invoked, as disclosed at step 514. FIG. 17*b* shows a flowchart of a cooldown operation. Referring to FIG. 17*b*, a check is performed to determine if the second stage temperature is less than 17K, as depicted at step 520. If it is, than a check is performed to determine if the first stage temperature is within 0.5K of the setpoint, as shown at step 522. If the first stage temperature is within 0.5K of the setpoint, then cooldown is complete, as shown at step 524, and control reverts to step 500 until the next polling interval.

If the second stage temperature is greater than 17K, or if the first stage temperature is not within 0.5K of the setpoint, cooldown is continuing and the cryopump can benefit from excess helium. A temporary helium maximum is computed to allocate the excess helium, according to the following formula:

System Excess=sum (Margin of all Cryopumps)

Temp Max=Current Max Consumption+

System Excess*(Cryopump Size/sum (Cryopump Size)

The total excess computed above therefore, is divided proportionally among the cryopumps based on their size, and added to the current maximum helium consumption parameter, as disclosed at step 526. Note that while all cryopumps are apportioned a share of the excess, alternative embodiments may apportion the helium according to an alternate formula, such as apportioning excess helium only to cryopumps in cooldown. A temporary drive motor speed is computed to correspond to the new temporary maximum helium consumption parameter, also shown at step 526.

The newly computed drive motor speed is then compared to the minimum and maximum drive motor speeds, similar to step 518 above. A check is performed to determine if the second stage temperature is greater than 40K, as disclosed at step 530. If the second stage is 40K or warmer, a check is performed to determine if the new temporary drive motor speed is greater than the maximum rpm, typically 144 rpm, as shown at step 530. If the temporary drive motor speed is greater than the maximum rpm, then the drive motor speed is set to the maximum rpm, as depicted at step 532. If the temporary drive motor speed is not greater than the maximum rpm, as examined at step 536, than the drive motor speed is set to the temporary drive motor speed, as shown at step 538. If the temporary drive motor speed is less than the minimum rpm, then the drive motor speed is set to the minimum drive motor speed, as depicted in step 540.

If the second stage temperature is less than 40K, then a check is performed to determine if the temporary drive motor speed is greater than 72 rpm, as shown at step 534. If the temporary drive motor speed is not greater than 72 rpm, than the drive motor speed is set to the lower of the temporary drive motor speed or the minimum rpm, as depicted above in step 536. If the temporary drive motor speed is greater than 72, then the drive motor speed is set to 72 rpm, as shown at step 542. In this manner, the drive motor will tend to run at the temporary drive motor speed or at the maximum speed until the second stage cools to 40K, and will then tend to run at the temporary drive motor speed or at 72 until cooldown is complete.

Those skilled in the art should readily appreciate that the programs defining the operations and methods defined herein are deliverable to a helium management control system in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components.

While the system and method for controlling helium distribution have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A cryopump, comprising:
   a cryopanel;
   a cryogenic refrigerator which is configured to cool the cryopanel, the cryogenic refrigerator including a drive motor configured to drive the cryogenic refrigerator, the cryogenic refrigerator being coupled to at least one compressor configured to supply a refrigerant, the at least one compressor including a high pressure supply line and a low pressure exhaust line; and
   a controller to control consumption of the refrigerant in the cryogenic refrigerator during a cooling operation bringing the temperature of the cryogenic refrigerator down to operating temperature by varying the speed of the drive motor based on a differential pressure between the high pressure supply line and the low pressure exhaust line of the cryogenic refrigerator.

2. The cryopump as in claim 1 wherein the controller operates using at least three modes of control: normal, over pressure, and under pressure.

3. The cryopump as in claim 2 wherein if the differential pressure is greater than an over pressure mode setpoint, the controller is configured to respond via the cooling operation by operating in over pressure mode, and increasing the drive motor speed.

4. The cryopump as in claim 3 wherein the over pressure mode set point is a pressure differential of 205 psi.

5. The cryopump as in claim 3 wherein the controller is configured to respond to the over pressure mode by decreasing a temperature setpoint of the cryopump.

6. The cryopump as in claim 5 wherein decreasing the temperature setpoint further includes causing the cryogenic refrigerator to consume additional helium and reducing a temperature of the cryopump.

7. The cryopump as in claim 2 wherein if the differential pressure is less than an under pressure mode setpoint, the controller is configured to respond by operating in under pressure mode and decreasing the drive motor speed.

8. The cryopump as in claim 7 wherein the under pressure setpoint is a pressure differential of 190 psi.

9. The cryopump as in claim 7 wherein the controller is configured to operate in under pressure mode by increasing a temperature setpoint of the cryopump.

10. The cryopump as in claim 9 wherein increasing the temperature setpoint further includes allowing the cryogenic refrigerator to warm and consume less helium.

11. The cryopump as in claim 7 wherein the under pressure mode setpoint is used by the controller to vary the speed of the drive motor to match a temperature of a first stage of the cryopump to the temperature setpoint, using closed loop control.

12. The cryopump as in claim 2 further including:
a compressor bank having the at least one compressor configured to supply the refrigerant to the cryogenic refrigerator;
the cryogenic refrigerator arranged to consume the refrigerant; and
the controller configured to regulate refrigerant supply to the cryogenic refrigerator in response to pressure readings from the high pressure supply line and the low pressure exhaust line.

13. The cryopump as in claim 12 wherein the controller is configured to regulate the refrigerant supply in response to a differential pressure (DP) between the high pressure supply line and the low pressure exhaust line.

14. The cryopump as in claim 2 wherein the controller operating in the over pressure mode or the under pressure mode prevents any further changes to the cryopump in order to allow the cryopump to stabilize.

15. The cryopump as in claim 3 wherein the controller compares a differential pressure (DP) between a high pressure supply line and a low pressure exhaust line with the over pressure mode setpoint.

16. The cryopump as in claim 7 wherein the controller compares a differential pressure (DP) between the high pressure supply line and the low pressure exhaust line with the under pressure mode setpoint.

17. The cryopump as in claim 13 wherein the electronic controller is further configured to:
compute an available quantity of the refrigerant; and
regulate consumption of the refrigerant based, at least in part, on the computed available quantity of the refrigerant and the differential pressure (DP).

18. A system of controlling as cryopump, the system comprising:
a cryopanel;
a cryogenic refrigerator which is configured to cool the cryopanel, the cryogenic refrigerator including a drive motor configured to drive the cryogenic refrigerator;
a controller to control consumption of refrigerant in the cryogenic refrigerator during a cooling operation bringing the temperature of the cryogenic refrigerator down to operating temperature by varying the speed of the drive motor based on a differential pressure between a high pressure supply line and low pressure exhaust line of the cryogenic refrigerator; and
a compressor bank, coupled to the cryogenic refrigerator, having at least one compressor configured to supply the refrigerant, the at least one compressor including the high pressure supply line and the low pressure exhaust line.

19. The system of controlling the cryopump as in claim 18 wherein the controller is configured to regulate refrigerant supply to the cryogenic refrigerator in response to a differential pressure (DP) between the high pressure supply line and the low pressure exhaust line.

20. A system of controlling as cryopump, the system comprising:
a cryopump including a cryogenic refrigerator and a drive motor configured to drive the cryogenic refrigerator, the cryogenic refrigerator being coupled to at least one compressor configured to supply a refrigerant, the at least one compressor including a high pressure supply line and a low pressure exhaust line; and
an electronic controller configured to control a cryopump, the electronic controller controlling consumption of the refrigerant in the cryopump during a cooling operation to bring the temperature of the cryogenic refrigerator down to operating temperature by varying the speed of the drive motor based on a differential pressure between the high pressure supply line and the low pressure exhaust line of the cryogenic refrigerator.

* * * * *